United States Patent [19]

Yamamoto et al.

[11] Patent Number: 5,361,093
[45] Date of Patent: Nov. 1, 1994

[54] AUTOMATIC WHITE BALANCE SETTING DEVICE

[75] Inventors: Yasutoshi Yamamoto, Katano; Masayuki Noneyama, Takatsuki; Norio Suzuki, Neyagawa, all of Japan

[73] Assignee: Matsushita Electric Industrial Co., Ltd., Osaka, Japan

[21] Appl. No.: 938,953

[22] Filed: Sep. 1, 1992

[30] Foreign Application Priority Data

| Sep. 2, 1991 | [JP] | Japan | 3-221501 |
| Sep. 2, 1991 | [JP] | Japan | 3-221502 |
| Sep. 2, 1991 | [JP] | Japan | 3-221503 |
| Apr. 10, 1992 | [JP] | Japan | 4-090503 |
| Apr. 10, 1992 | [JP] | Japan | 4-090504 |

[51] Int. Cl.⁵ .......................... H04N 9/73; H04N 9/04
[52] U.S. Cl. ..................................... 348/223; 348/656
[58] Field of Search ............... 358/29 C, 29, 41, 22; 348/656, 223; H04N 9/73, 9/04

[56] References Cited

U.S. PATENT DOCUMENTS

| 3,877,068 | 4/1975 | Kosaka et al. | 358/29 |
| 4,219,841 | 8/1980 | Nishimura et al. | 358/29 C |
| 4,797,733 | 1/1989 | Takagi et al. | 358/29 C |
| 5,177,599 | 1/1993 | Takagi et al. | 358/29 C |

FOREIGN PATENT DOCUMENTS

| 0335623 | 10/1989 | European Pat. Off. | H04N 9/73 |
| 0400606 | 12/1990 | European Pat. Off. | H04N 9/73 |
| 0429992 | 6/1991 | European Pat. Off. | H04N 9/73 |
| 2287819 | 5/1976 | France | H04N 9/73 |
| 2650143 | 1/1991 | France | H04N 9/73 |
| 62-029296 | 2/1987 | Japan | H04N 9/73 |
| 62-107591 | 5/1987 | Japan | H04N 9/73 |
| 29296 | 7/1987 | Japan | H04N 9/73 |
| 63-219291 | 9/1988 | Japan | H04N 9/73 |
| 257786 | 8/1990 | Japan | H04N 9/73 |

Primary Examiner—James J. Groody
Assistant Examiner—Glenton B. Burgess
Attorney, Agent, or Firm—Ratner & Prestia

[57] ABSTRACT

An automatic white balance device that uses a video signal to obtain the white balance data, and is characterized by using a third video signal, selectively obtained using a first video signal expressing the color signals and a second video signal expressing the luminance, to obtain the white balance.

5 Claims, 17 Drawing Sheets

AUTOMATIC WHITE BALANCE SETTING DEVICE

BACKGROUND OF THE INVENTION

1. Field of the invention

The present invention relates to an automatic white balance device used in such products as a video camera.

2. Description of the Prior Art

The mainstream in automatic white balance devices used in conventional video cameras is shifting towards internal measurement method devices that do not require an external sensor. The operation of the internal measurement device is based on the assumption that averaging all subject colors will result in an achromatic signal. More specifically, this means the average values of the red, blue, and green signals on the image plane will be equal. Of course, when any signal component of the total image is a single solid color occupying a large part of the screen area, this principle will not result in correct white balance adjustment. It is therefore necessary in these cases to substitute signal for the chromatic signal to obtain the correct white balance.

A conventional automatic white balance device comprises a difference circuit, comparator, gate circuit, chrominance signal integrator, microcomputer, and chrominance signal amplifier. The R and B chrominance signals are input to the difference circuit, the blue chrominance signal level is subtracted from the red chrominance signal level, and the (R−B) difference signal is output. This difference circuit output is input to the comparator, which compares the input with a predetermined threshold level to obtain and output a gate signal to the gate circuit. The threshold level is set so that the gate signal is on when the difference between the red and blue signals is not too great, i.e., when the video signal is determined to not be biased towards red or blue. The gate circuit relays the red and blue signals to the chrominance signal integrator based on the gate signal input from the comparator. The chrominance signals input to the color signal integrator are accumulated for one field in one screen, and the integral is then output. The microcomputer then computes the gain of each chrominance signal required for the ratio between the R and the B signal integrals output from the chrominance signal integrator to be 1:1, adjusts the gain of the chrominance signal multiplier, and thus outputs the white balanced signal.

With this configuration, however, the value of the (R−B) color difference signal will be low under low luminance conditions even with a chromatic image because the signal quantity itself is low. As a result, the conventional automatic white balance device will determine the image to be achromatic, use this data for the white balance adjustment, and will not, therefore, result in an accurate white balance.

SUMMARY OF THE INVENTION

Therefore, the object of the present invention is to assure that accurate white balance adjustment information can be obtained even under low luminance signal conditions.

To achieve this object, a automatic white balance device according to the present invention comprises an operator, a comparator, a selector, an integrator, and microcomputer, and characterized in that the operator is adapted to input a first video signal representing the chrominance signal and a second video signal representing the luminance signal to output a third video signal to be obtained by computing the first and second video signal, the comparator, compares the third video signal with any given threshold level, and outputs a control signal only when the level of the operator output signal is within a predetermined range, the selector selects the output signal from the operator to pick put only the video signal of achromatic color according to the control signal output from the comparator, an integrator for accumulats the integral of the signals output from the selector, and the output of integrator inputs into the microcomputer to obtain the white balance.

If the operation of this device is standardized, the chrominance signal will also be standardized according to the brightness level even under low luminance, chromatic signal conditions, making it possible to detect low luminance, chromatic signals. More accurate white balance information can thus be obtained because the low luminance, chromatic signal will have a minimal effect on the white balance.

BRIEF DESCRIPTION OF THE DRAWINGS

The present invention will become more fully understood from the detailed description given below and the accompanying diagrams wherein.

DESCRIPTION OF THE PREFERRED EMBODIMENTS

FIRST EMBODIMENT

Figure 1:
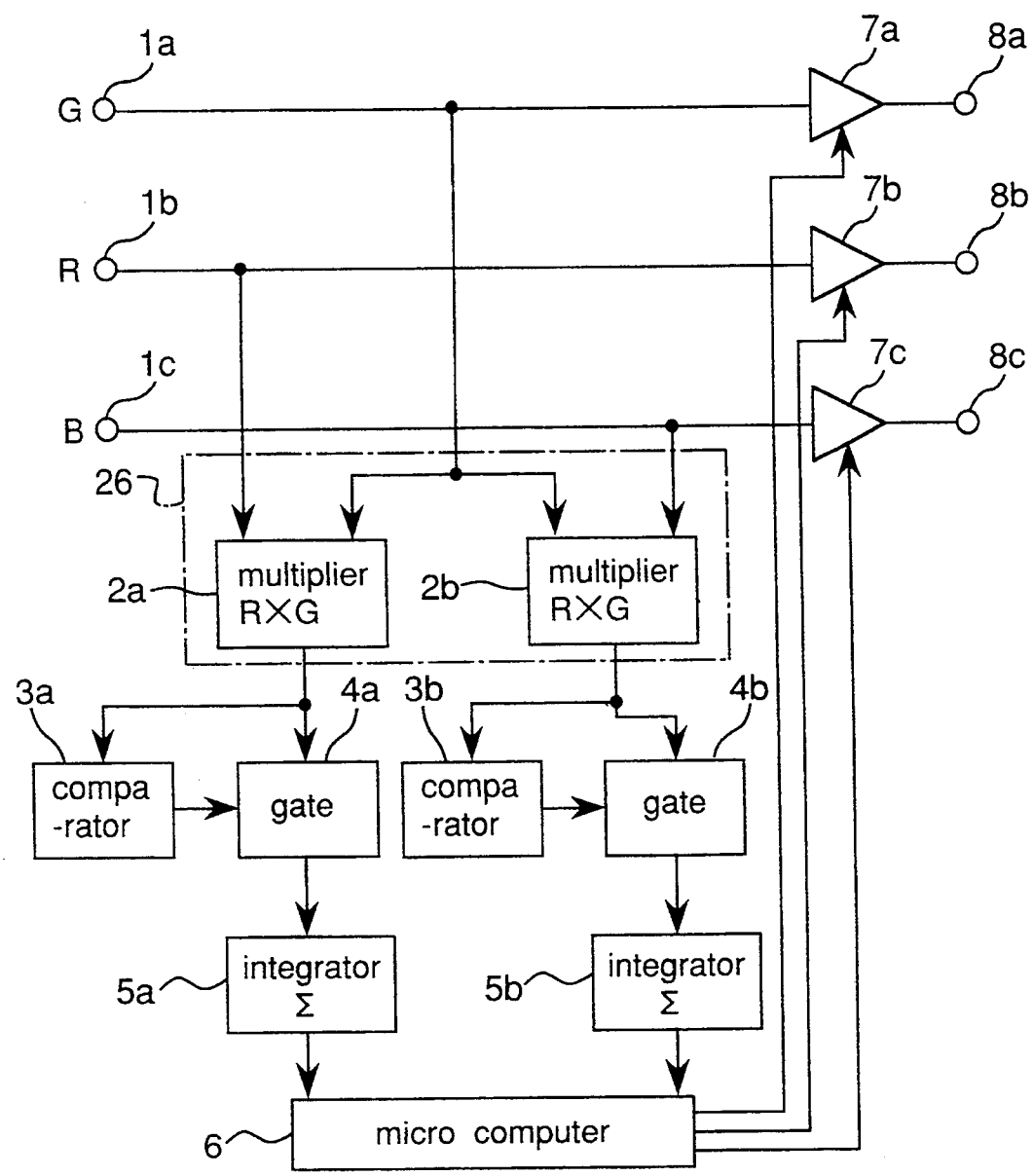
FIG. 1 is a block diagram of an automatic white balance device according to a first embodiment of the invention.

The preferred embodiments of an automatic white balance device according to the present invention are described below with reference to the accompanying figures, of which FIG. 1 is a block diagram of an automatic white balance device according to a first embodiment.

It is to be noted that the in the following descriptions the red, blue, and green (RGB) chrominance signal components of the video signal manipulated by the invention are hereinafter referred to the R, B, and G signals, respectively.

Referring to FIG. 1, the G signal input to a G signal input terminal 1a, the R signal input to a R signal input terminal 1b and the B signal input to a B signal input terminal 1c are input into an operator 26 which consists of a pair of multipliers 2a and 2b.

The R and G signals are multiplied and the product is weighted by the (R×G) multiplier 2a, and the weighted product is output as the R signal. Similarly, the B and G signals are multiplied and the product is weighted by the (B×G) multiplier 2b, and the weighted product is output as the B signal. The weighted R signal is input to a first comparator 3a for comparison with a predetermined threshold level. If the weighted R signal is greater than the threshold level, a gate signal is applied to the corresponding gate circuit 4a. The weighted B signal is similarly input to a second comparator 3b for comparison with a predetermined threshold level, and if the weighted B signal is greater than the threshold level, a gate signal is applied to the corresponding gate circuit 4b.

Figure 2:
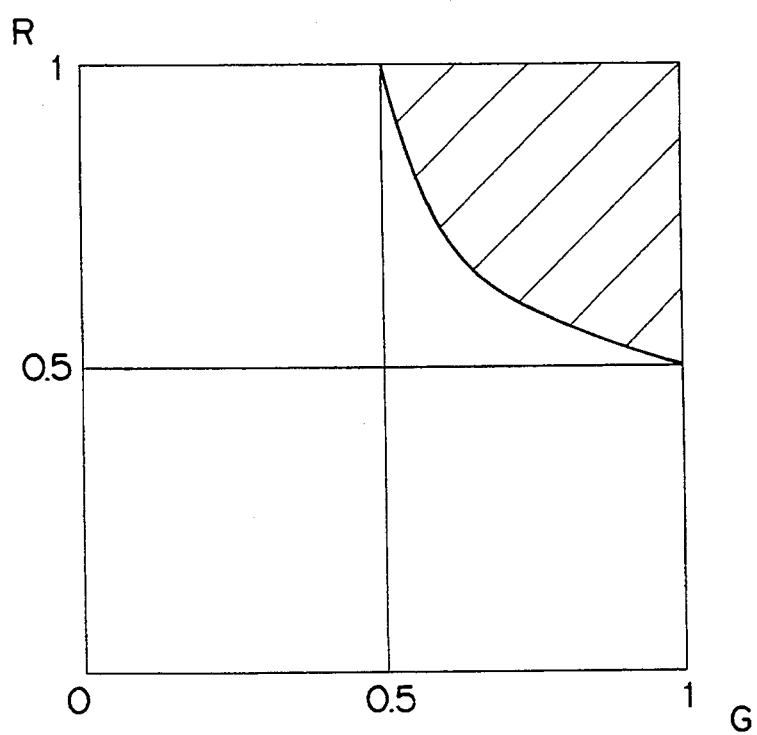
FIG. 2 is a color distribution graph used to describe the operation of an automatic white balance device according to a first embodiment of the invention.

The threshold level used in the above operation is preferably equal to approximately 0.5 when the maximum value of each of the R, G, and B signals is one (1). This corresponds to the shaded area in the color distribution graph shown in FIG. 2.

The gate circuits 4a and 4b thus output to the integrators 5a and 5b a weighted chrominance signal according to the gate signals input from the comparators 3a and 3b. The weighted chrominance signals input to the integrators 5a and 5b are accumulated for one field of one screen. The microcomputer 6 computes the average of the two weighted chrominance signals in one full screen based on the output signals from the integrators 5a and 5b, and computes the amplification rate that must be applied to the R and B signals to obtain a ratio of 1:1 between the average values of the weighted R and B signals.

For example, if the ratio between the weighted R signal integral and the weighted B signal integral is 6:4, a correct white balance can be obtained by adjusting the amplification rate of the R signal amplifier 7b to 5/6, and the amplification rate of the B signal amplifier 7c to 5/4. The gain of the R and B signal amplifiers 7b and 7c is thus adjusted, and white-balanced G, R, and B signals are output to the G signal output terminal 8a, R signal output terminal 8b, and B signal output terminal 8c, respectively.

In the first embodiment, it will be noted that because the R signal and B signal are multiplied by the G signal, which is close to the luminance signal, and weighted by the multipliers 2a, 2b, the weight of low luminance, chromatic signals is reduced. The effect of any low luminance, chromatic signals on the white balance can therefore be reduced, and an accurate white balance can be obtained.

Furthermore, while the threshold level of the comparators 3a, 3b is set to approximately 0.5 in this embodiment, there is a strong possibility that signals within this range will be white because both the difference between the G signal and the R and B signals is small and the luminance is high. In addition, there will still be minimal effect on the white balance when the threshold level is less than 0.5 because the R×G and B×G signal sums are small in a chromatic signal. Moreover, this threshold level can be varied according to the current subject (imaging) conditions. For example, if the overall luminance of the subject image is high, there is a high probability that the input signal will be within the range of the shaded area in FIG. 2, but when the overall luminance of the image is low, the probability is low that the input signal will be within the range of the shaded area in FIG. 2. Because there are situations in which a correct white balance cannot be obtained in these cases, the white balance information can be obtained by lowering the threshold level and increasing the signal quantity passing through the gate circuit.

Furthermore, a gate circuit is used as the signal selection means in this embodiment, but the same effect can be obtained by using a clipping circuit that clips off signals exceeding a predetermined level. In addition, if the clipping level of this clipping circuit is set to the threshold level of the comparators 3a, 3b, the comparators can be eliminated.

A video signal is also used as the input signal to the multipliers in this embodiment, but the same effect can be obtained by dividing one screen into plural blocks and using a representative value of the signals in each block as the video signal. This process of dividing the screen into plural blocks is described below.

Figure 3:
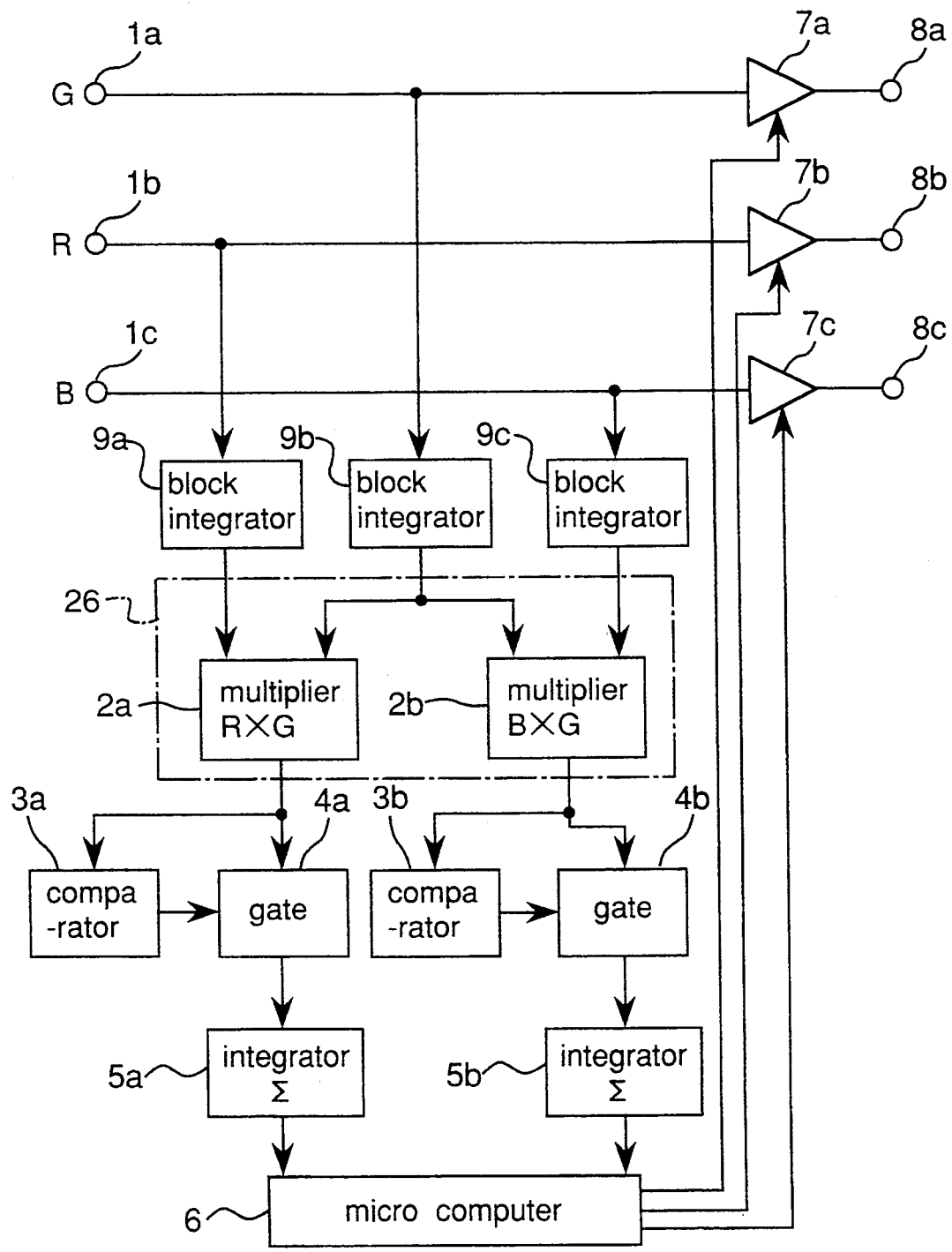
FIG. 3 is a block diagram of an automatic white balance device according to a first embodiment of the invention when the data is manipulated by block.
Figure 4:
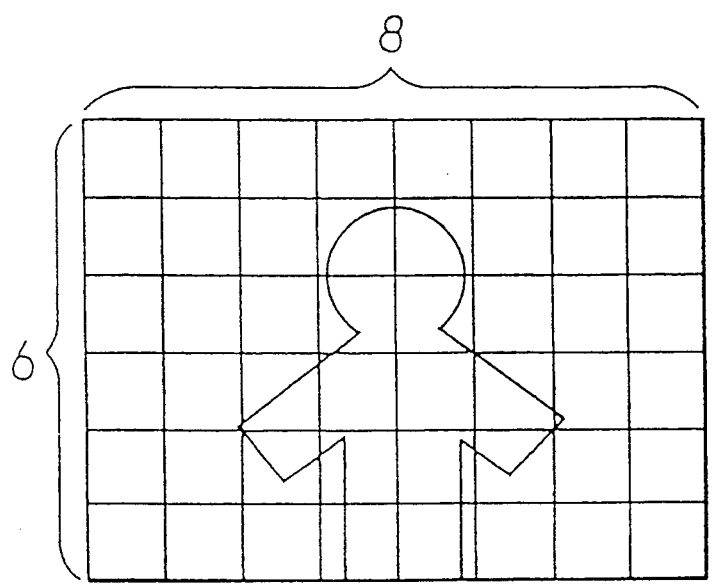
FIG. 4 is a graph used to describe the block separation of an automatic white balance device according to a first embodiment of the invention.

Referring to FIG. 3, the chrominance signals input to the G signal input terminal 1a, R signal input terminal 1b, and B signal input terminal 1c are respectively input to the G signal block integration circuit 9a, R signal block integration circuit 9b, and B signal block integration circuit 9c. Each signal block integration circuit 9a, 9b, and 9c divides the video signal for one field into a 48 block matrix of 8 horizontal and 6 vertical blocks as shown in FIG. 4, and each integration circuit outputs the average of the corresponding R, G, or B signal in each block. The operation of the signal block integration circuits 9 is described in detail below with specific reference to the R signal.

Figure 5:
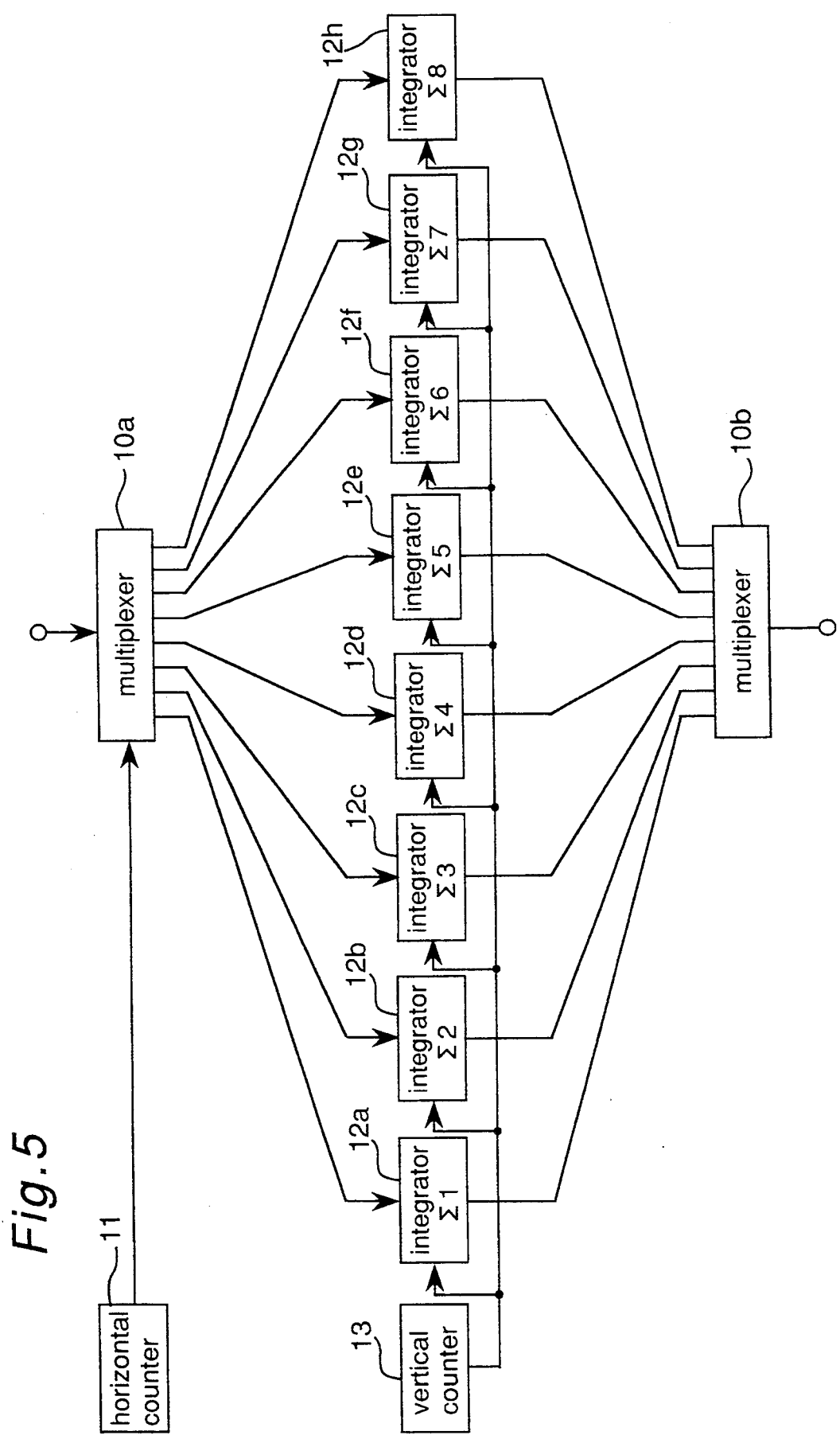
FIG. 5 is a block diagram of the internal structure of the block integration circuit shown in FIG. 3.

FIG. 5 is a block diagram of the internal structure of the block integration circuit shown in FIG. 3. In this circuit the multiplexer 10a selects the first integration circuit 12a at the beginning of the valid horizontal scan period, and the R signal input to the multiplexer 10a is thus input to the first integration circuit 12a and integrated. The horizontal counter 11 counts the clock signal and sends a control signal to the multiplexer 10a after ⅛ of the valid horizontal scan period. The multiplexer 10a thus selects the second integration circuit 12b, and inputs the R signal to the second integration circuit 12b.

The second integration circuit 12b integrates the R signal for the next ⅛ valid horizontal scan period, after which period the multiplexer 10a is incremented to the next integration circuit 12. Integration of the R signal thus continues until the valid horizontal scan period has ended and R signal integration is completed in the eighth integration circuit 12h.

At the beginning of the next horizontal scan period, the multiplexer 10a again selects the first integration circuit 12a, and the R signal is again integrated by the first integration circuit 12a. This operation continues so that the R signal is integrated for each of the scan lines. During this integration period the vertical counter 13 counts the scan lines, and after each 1/6 valid vertical scan period causes the accumulated integral of the integration circuits to be output through a second multiplexer 10b. In other words, when the last scan line for 1/6 of the valid vertical scanning period is integrated, integration by the first integration circuit 12a after the first ⅛ valid horizontal scanning period is completed, the multiplexer 10a selects the second integration circuit 12b, the second multiplexer 10b selects the first integration circuit 12a during integration by the second integration circuit 12b, and the integral from the first integration circuit 12a is output as the output signal of the block integration circuit 9. Integration by the second integration circuit 12b ends after the next ⅛ horizontal scanning period, and when integration by the third integration circuit 12c begins the second multiplexer 10b selects the second integration circuit 12b and outputs the integral returned by the second integration circuit 12b as the output signal of the block integration circuit 9. The integrals returned by each integration circuit are thus successively output, and when the integral returned by the eighth integration circuit 12h is output the integral of each integration circuit is reset.

When the valid scanning period for the next scan line begins, the integration loops is started again from the first integration circuit 12a, and each integration circuit again outputs the accumulated integral as the output signal of the block integration circuit 9 after the next 1/6 vertical scanning period. Eight integrals are thus obtained for each 1/6 vertical scanning period, and when the full scanning period is completed 48 integrals will have been output. This same operation is performed by the G signal block integration circuit 9a for the G signal and the B signal block integration circuit 9c for the B signal, and a total of (48 blocks×3=) 144 signals are output for each screen.

The block data thus obtained is processed through the multipliers 2, comparators 3, gate circuits 4, and integrators 5a and 5b, the white balance gain is computed by the microcomputer 6, and the white balance is thus adjusted. However, because there is relatively little block data, it is also possible to perform all of the operations performed by the multipliers 2, comparators 3, gate circuits 4, and integrators 5 in the microcomputer 6. Furthermore, because the multipliers 2, comparators 3, gate circuits 4, and integrators 5 can thus be eliminated, the circuit scale can also be reduced. It is noted that the present embodiment can be realized not only by an analog circuit but also by a digital circuit.

SECOND EMBODIMENT

The second embodiment of an automatic white balance device according to the present invention is described below with reference to the accompanying figures.

Figure 6:
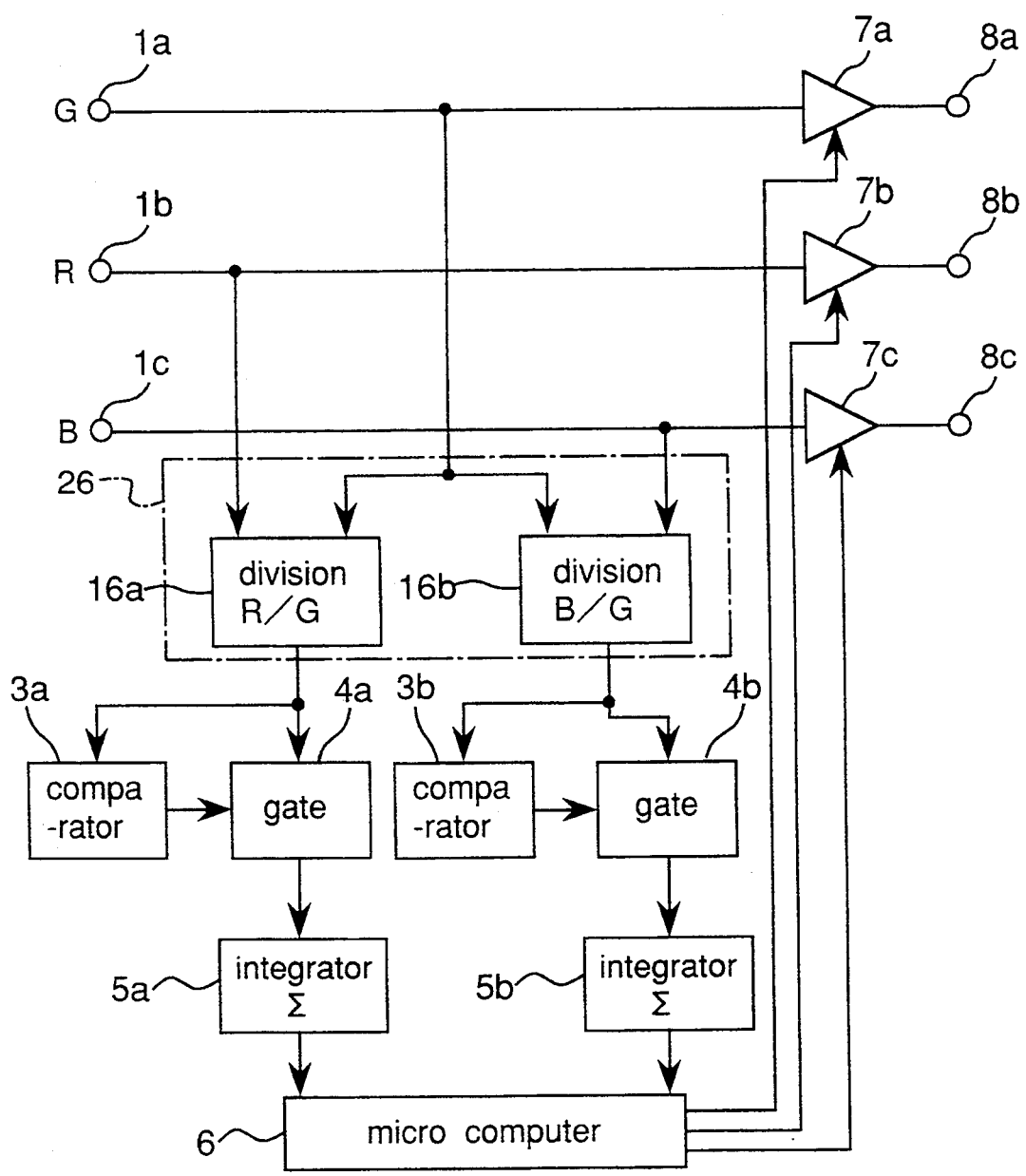
FIG. 6 is a block diagram of an automatic white balance device according to a second embodiment of the invention.

Referring to FIG. 6, the G signal input to a G signal input terminal 1a, the R signal input to a R signal input terminal 1b, and the B signal input to a B signal input terminal 1c are input into an operator 26 which consists of a pair of dividers 16a, 16b. The G signal input to the G signal input terminal 1a and the R signal input to the R signal input terminal 1b are input to the R/G divider 16a. The G signal and the B signal input to the B signal input terminal 1c are input to the B/G divider 16b. The R/G divider 16a divides the R signal by the G signal, and outputs a normalized R signal. The B/G divider 16b divides the B signal by the G signal, and outputs a normalized B signal. The normalized R signal is input to the corresponding comparator 3a, and compared with a threshold level. If the normalized R signal is within a certain range, a gate signal is applied to the corresponding gate circuit 4a. The normalized B signal is input to the corresponding comparator 3b, and compared with a threshold level. If the normalized B signal is within a certain range, a gate signal is applied to the corresponding gate circuit 4b.

Figure 7:
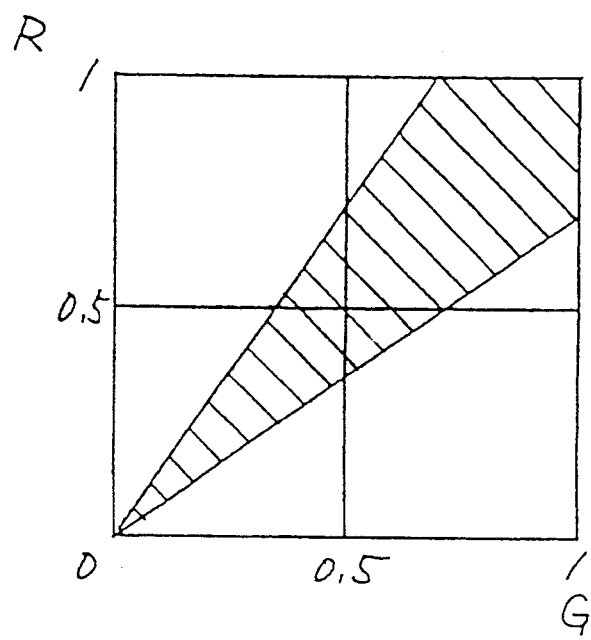
FIG. 7 is a vectorscope diagram used to describe the operation of an automatic white balance device according to a third embodiment of the invention.

The threshold level used in the above operation is preferably set so that the gate signal is output when the normalized R and B signals are within the range 0.7 to 1.5 when the maximum value of the R, G, and B signals is one (1) each. In other words, the threshold level is adjusted so that the gate signal is on in the shaded area of the color distribution graph shown in FIG. 7. It is to be noted that the FIG. 7 graph has a G signal ordinate and R signal abscissa, but the relationship between the G and B signals is expressed in the same area.

The gate circuits 4a, 4b input the normalized signals to the integrators 5a and 5b according to the gate signals from the comparators 3a and 3b. The normalized signals input to the integrators 5a and 5b are then integrated for one field of the screen. The microcomputer 6 computes the average of the two normalized signals in one full screen based on the output signals from the integrators 5a and 5b, computes the amplification rate that must be applied to the R and B signals to obtain an average of 1 for the normalized signals, and adjusts the gain of the R signal amplifier 7b and B signal amplifier 7c accordingly. White-balanced R, G, and B signals are thus output to the G signal output terminal 8a, R signal output terminal 8b, and B signal output terminal 8c, respectively.

In this embodiment, low luminance, chromatic chrominance signals are normalized to the same level as high luminance level, chromatic chrominance signals because the R and B signals are normalized by the G signal, which is close to the luminance signal Y, by the dividers 16a and 16b. It is therefore possible for the gate circuits 4a, 4b to separate low luminance, chromatic signals, making it possible to more precisely determine the color temperature and obtain a more accurate white balance.

Furthermore, a gate circuit is used as the signal selection means in this embodiment, but the same effect can be obtained by using a clipping circuit that clips off signals exceeding a predetermined level.

In addition, a video signal is used as the input signal to the dividers in this embodiment, but the same effect can be obtained by dividing one screen into plural blocks and using a representative value of the signals in each block as the video signal. Also, it is noted that the present embodiment can be realized not only by an analog circuit, but also by a digital circuit.

THIRD EMBODIMENT

The third embodiment of an automatic white balance device according to the present invention is described below with reference to the accompanying figures.

Figure 8:
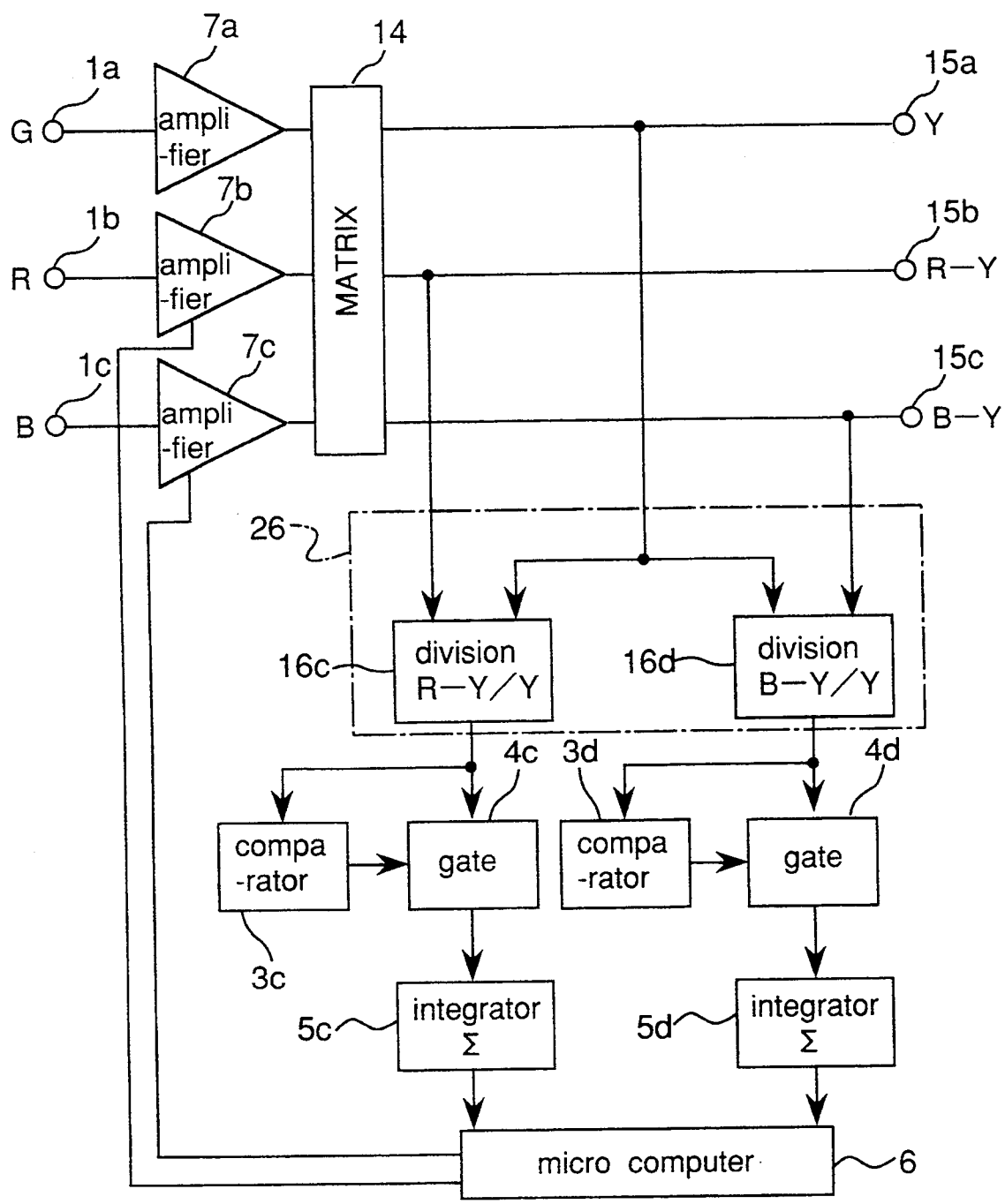
FIG. 8 is a block diagram of an automatic white balance device according to a third embodiment of the invention.

Referring to FIG. 8, the G signal input to the G signal input terminal 1a, the R signal input to the R signal input terminal 1b, and the B signal input to the B signal input terminal 1c are input to the matrix circuit 14 and converted thereby to a luminance signal Y and color difference signals (R−Y) and (B−Y). The output signals Y, (R−Y) and (B−Y) from the matrix circuit 14 are input to the operator 26 which consists of a pair of dividers 16c and 16d.

The (R−Y) signal output from the matrix circuit 14 and the luminance signal Y are input to the first divider 16c. The (R−Y) signal is thus divided by the luminance signal Y, and a normalized (R−Y) signal is output. The (B−Y) signal output from the matrix circuit 14 and the luminance signal Y are input to the second divider 16d. The (B−Y) signal is thus divided by the luminance signal Y, and a normalized (B−Y) signal is output. The normalized (R−Y) signal is input to the corresponding comparator 3c and compared with a threshold level. If the normalized (R−Y) signal is within a certain range, a gate signal is applied to the corresponding gate circuit 4c. The normalized (B−Y) signal is input to the other comparator 3d and compared with a threshold level. If the normalized (B−Y) signal is within a certain range, a gate signal is applied to the corresponding gate circuit 4d.

The threshold level used in the above operation is preferably within the range −0.2 to 0.2 when the maximum value of the normalized color difference signals is one (1). In other words, the threshold level is adjusted so that the gate signal is on in the shaded area of the vectorscope graph shown in FIG. 9.

The gate circuits 4c, 4d input the normalized color difference signals to the integrators 5c and 5d according to the gate signals from the comparators 3c, 3d, and the normalized color difference signals are thus integrated for one field in one screen. Based on the integrator 5c and 5d output signals, the microcomputer 6 then computes the amplification rate to be applied to the R and B signals so that the average of the two normalized color difference signals is zero, adjusts the gain of the R signal amplifier 7b and the B signal amplifier 7c, and inputs the white balanced R, G, and B signals to the matrix circuit 14. The matrix circuit 14 thus outputs the white balanced luminance signal Y and color difference signals (R−Y) and (B−Y) to the Y signal output terminal 15a, (R−Y) signal output terminal 15b, and (B−Y) signal output terminal 15c.

Figure 9:
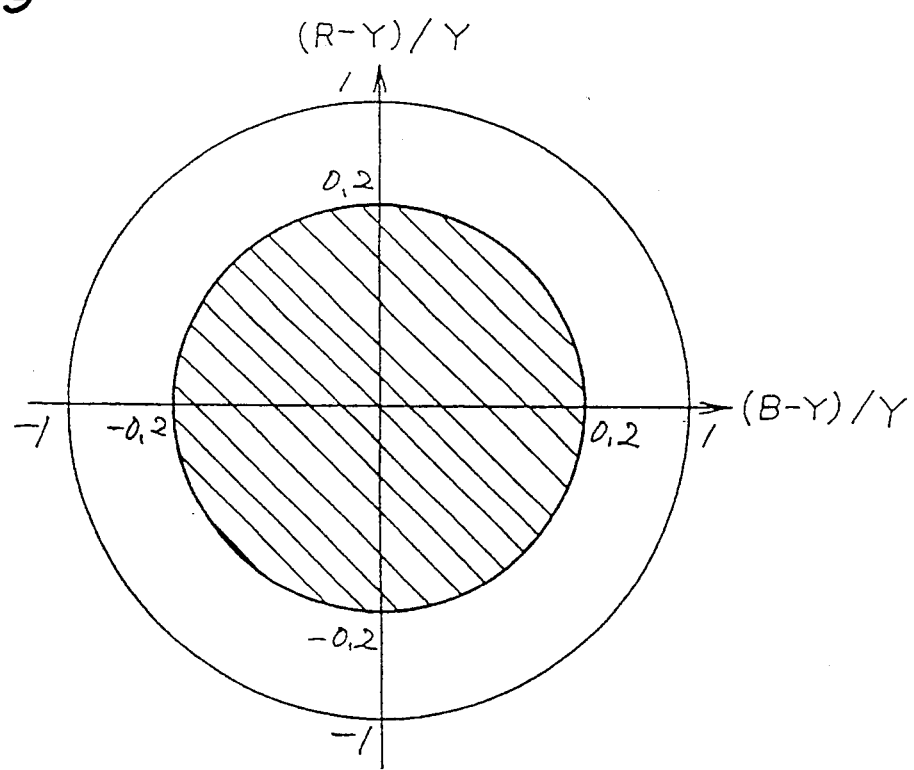
FIG. 9 is a vectorscope diagram used to describe the operation of an automatic white balance device according to the third embodiment of the invention.

A low luminance, chromatic color difference signal will be normalized to a level equivalent with a high luminance level, chromatic color difference signal in this embodiment because the (R−Y) and (B−Y) color difference signals are normalized by the luminance signal Y by means of the dividers 16c, 16d. Referring to FIG. 9, the signal will be outside the shaded area of the normalized vectorscope graph. The gate circuits 4c, 4d can thus distinguish low luminance, chromatic signals, the color temperature can be more accurately determined, and an accurate white balance can be obtained.

Furthermore, a gate circuit is used as the signal selection means in this embodiment, but the same effect can be obtained by using a clipping circuit that clips off signals exceeding a predetermined level.

In addition, a video signal is used as the input signal of the dividers in this embodiment, but the same effect can be obtained by dividing one screen into plural blocks and using a representative value of the signals in each block as the video signal. Also, it is noted that the present embodiment can be realized not only by an analog circuit, but also by a digital circuit.

FOURTH EMBODIMENT

The fourth embodiment of an automatic white balance device according to the present invention is described below with reference to the accompanying figures.

Figure 10:
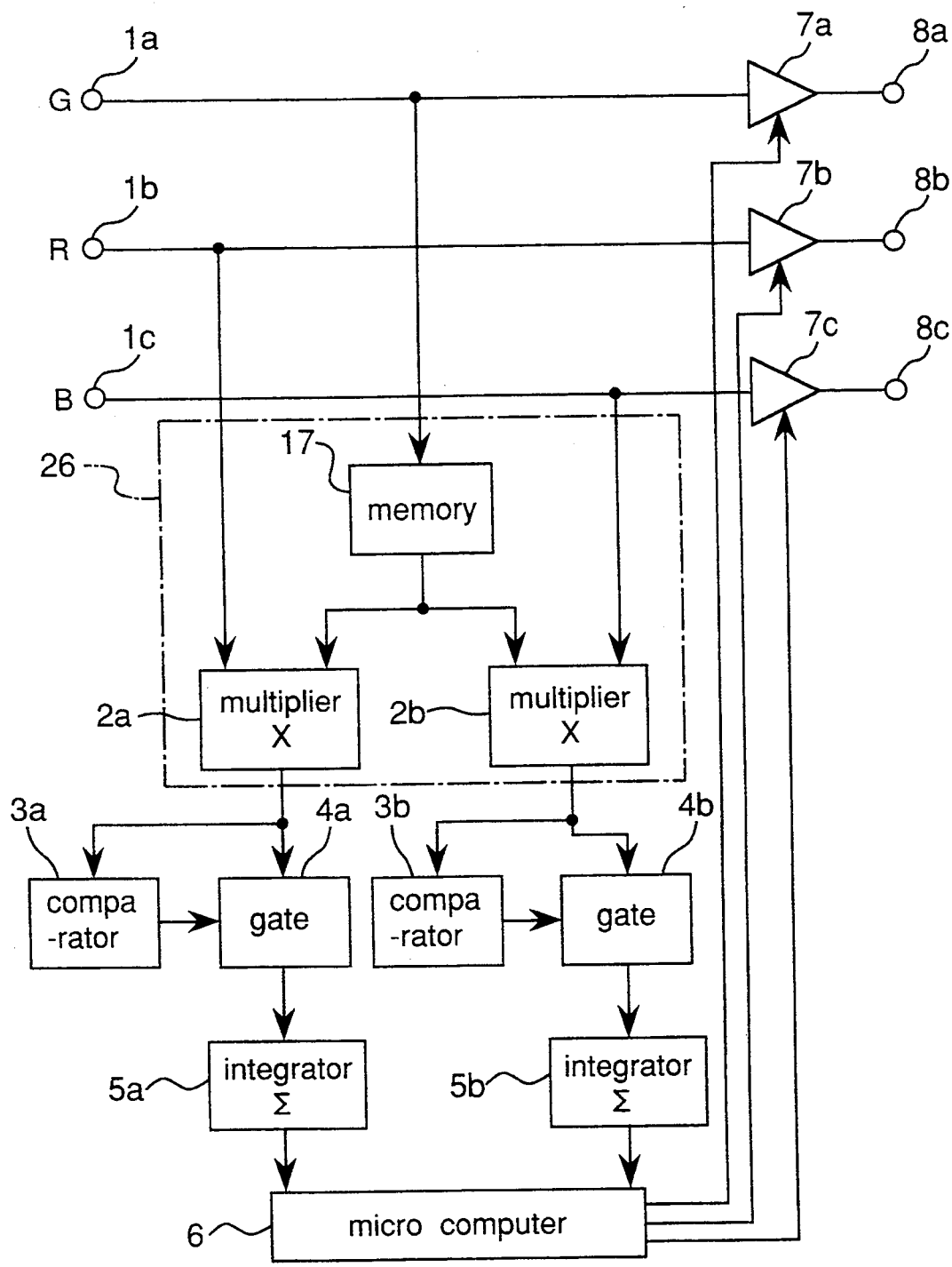
FIG. 10 is a block diagram of an automatic white balance device according to a fourth embodiment of the invention.

Referring to FIG. 10, the G signal input to the G signal input terminal 1a, the R signal input to the R signal input terminal 1b and the B signal input to the B signal input terminal 1c are input to the operator 26, which consists of a memory 17 and a pair of multipliers. The G signal input to the G signal input terminal 1a is input to the memory device 17. The output signal of the memory device 17 is dependent upon the G signal input thereto. Specifically, the memory device 17 stores a value array such that a low signal is output when the input signal level is high, and a high signal is output when the input signal level is low.

The memory device 17 output signal and the R signal input to the R signal input terminal 1b are input to the first multiplier 2a, and the memory device 17 output signal and B signal input to the B signal input terminal 1c are input to the second multiplier 2b. A weighted R signal is obtained from the first multiplier 2a by multiplying the R signal and memory device 17 output, and a weighted B signal is obtained from the second multiplier 2b by multiplying the B signal and memory device 17 output. The weighted R signal is input to the comparator 3a, compared with a threshold level, and a gate signal is conditionally output to the gate circuit 4a. Similarly, the weighted B signal is input to the comparator 3b, compared with a threshold level, and a gate signal is conditionally output to the gate circuit 4b.

The threshold level used in the above operation is preferably set so that the gate signal is output when the normalized R and B signals are within the range 0.7 to 1.5 when the maximum value of the R, G, and B signals is one (1) each. In other words, the threshold level is adjusted so that the gate signal is on in the shaded area of the color distribution graph shown in FIG. 7.

The gate circuits 4a, 4b input the weighted chrominance signals to the integrators 5a and 5b according to the gate signals from the comparators 3a and 3b. The weighted signals input to the integrators 5a and 5b are then integrated for one field of the screen. The microcomputer 6 computes the average of the two weighted signals in one full screen based on the output signals from the integrators 5a and 5b, computes the amplification rate that must be applied to the R and B signals to obtain a ratio of 1:1 for the averages of the weighted chrominance signals, and adjusts the gain of the R signal amplifier 7b and B signal amplifier 7c accordingly. White-balanced G, R, and B signals are thus output to the G signal output terminal 8a, R signal output terminal 8b, and B signal output terminal 8c, respectively.

In this embodiment, the output level of low luminance, chromatic color signals is increased to the same level as a high luminance level, chromatic color signal because the R and B signals are multiplied with the output signal of the memory device 17 by means of the multipliers 2a, 2b. This operation weights the R and B signal products because the memory device 17 stores and is operated to output a low output signal level when the luminance level is high, and a high output signal level when the luminance level is low. It is therefore possible for the gate circuits 4a, 4b to separate low luminance, chromatic signals, making it possible to obtain a more accurate white balance.

It is to be noted that the preferred memory device in this embodiment is a ROM table.

Furthermore, a gate circuit is used as the signal selection means in this embodiment, but the same effect can be obtained by using a clipping circuit that clips off signals exceeding a predetermined level.

In addition, a video signal is used as the input signal to the multipliers and memory device in this embodiment, but the same effect can be obtained by dividing one screen into plural blocks and using a representative value of the signals in each block as the video signal.

FIFTH EMBODIMENT

The fifth embodiment of an automatic white balance device according to the present invention is described below with reference to the accompanying figures.

Figure 11:
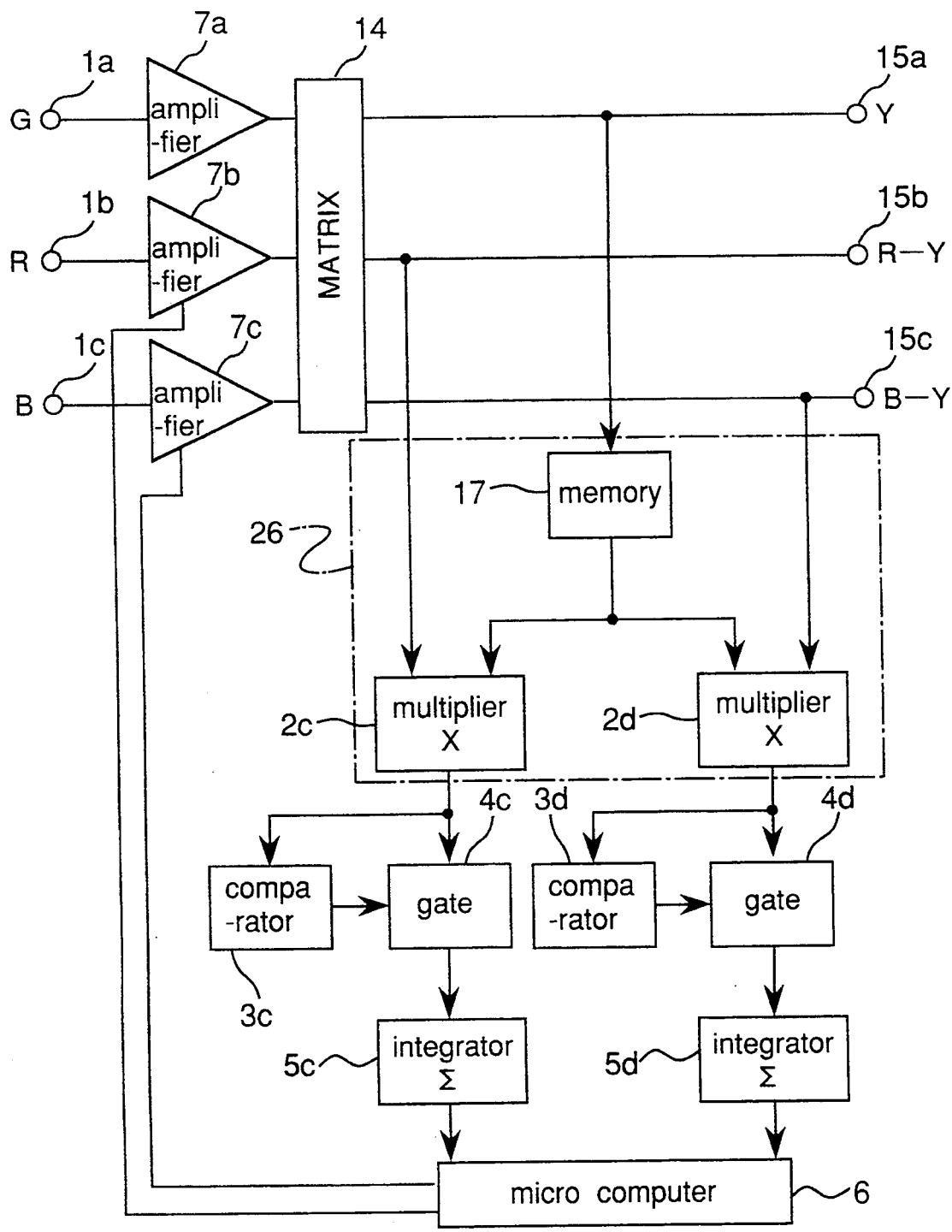
FIG. 11 is a block diagram of an automatic white balance device according to a fifth embodiment of the invention.

Referring to FIG. 11, the G signal input to the G signal input terminal 1a, the R signal input to the R signal input terminal 1b, and the B signal input to the B signal input terminal 1c are input to the matrix circuit 14 and converted thereby to a luminance signal Y and color difference signals (R−Y) and (B−Y). The output signals Y, (R−Y), (B−Y) from the matrix circuit 14 are input to the operator 26 which consists of a memory 17 and a pair of multipliers 2c and 2d. The luminance signal Y output by the matrix circuit 14 is input to the memory device 17.

The memory device 17 outputs a signal dependent upon the luminance signal Y input thereto. Specifically, the memory device 17 stores a value array such that a low signal is output when the input signal level is high, and a high signal is output when the input signal level is low.

The memory device 17 output signal and the matrix circuit 14 (R−Y) output signal are input to the first multiplier 2c, which outputs a weighted (R−Y) signal by multiplying the two inputs. Similarly, the memory device 17 output signal and matrix circuit 14 (B−Y) output signal are input to the second multiplier 2d, which outputs a weighted (B−Y) signal by multiplying the two inputs. The weighted (R−Y) signal is input to the comparator 3c, compared with a threshold level, and a gate signal is output to the gate circuit 4c when the (R−Y) signal is within a specific range. Similarly, the weighted (B−Y) signal is input to the comparator 3d, compared with a threshold level, and a gate signal is output to the gate circuit 4d when the (B−Y) signal is within a specific range.

Figure 12:
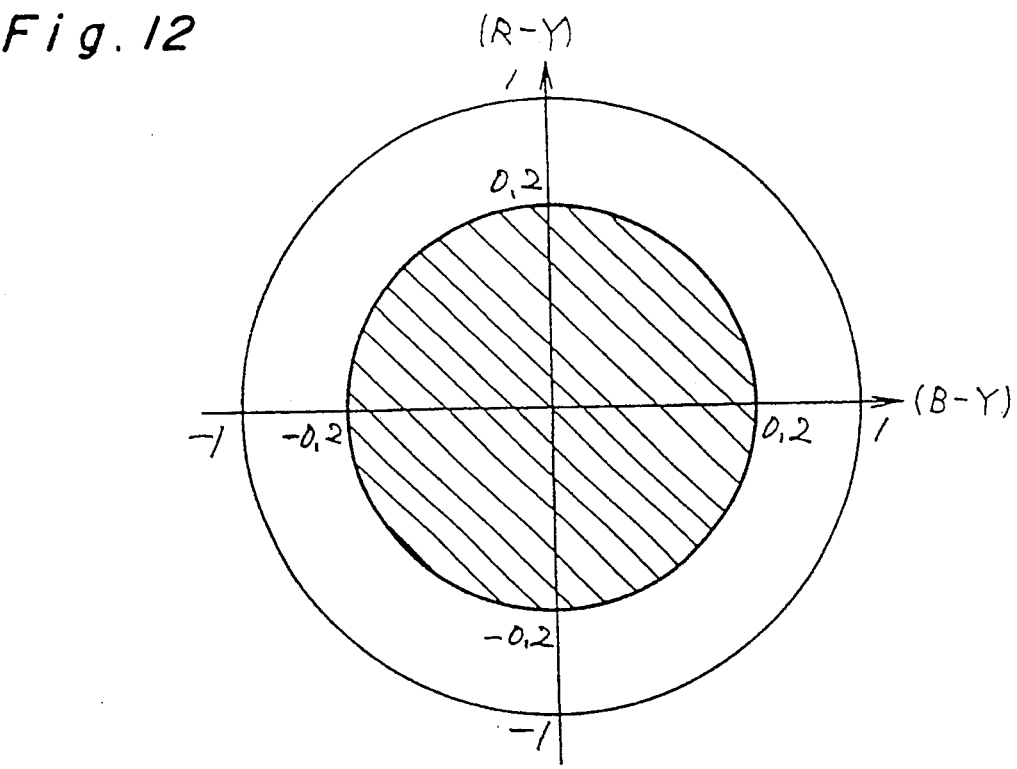
FIG. 12 is a vectorscope diagram used to describe the operation of an automatic white balance device according to the fifth embodiment of the invention.

The threshold level used in the above operation is preferably within the range −0.2 to 0.2 when the maximum value of the normalized color difference signals is one (1). In other words, the threshold level is adjusted so that the gate signal is on in the shaded area of the vectorscope graph shown in FIG. 12.

The gate circuits 4c, 4d input the normalized color difference signals to the integrators 5c and 5d according to the gate signals from the comparators 3c, 3d, and the normalized color difference signals are thus integrated for one field in one screen. Based on the integrator 5c and 5d output signals, the microcomputer 6 then computes the amplification rate to be applied to the R and B signals so that the average of the two normalized color difference signals is zero, adjusts the gain of the R signal amplifier 7b and the B signal amplifier 7c, and inputs the white balanced R, G, and B signals to the matrix circuit 14. The matrix circuit 14 thus outputs the white balanced luminance signal Y and color difference signals (R−Y) and (B−Y) to the Y signal output terminal 15a, (R−Y) signal output terminal 15b, and (B−Y) signal output terminal 15c.

The output level of a low luminance, chromatic color difference signal will thus be increased to a level equivalent with a high luminance level, chromatic color difference signal in this embodiment because the (R−Y) and (B−Y) color difference signals are multiplied with the output signal of the memory device 17 by means of the multipliers 2c, 2d. This operation weights the (R−Y) and (B−Y) color difference signal products because the memory device 17 stores and is operated to output a low output signal level when the luminance level is high, and a high output signal level when the luminance level is low. The gate circuits 4c, 4d can thus distinguish low luminance, chromatic signals, the effect of low luminance, chromatic signals on the white balance can be reduced, and the effects of variations in the saturation characteristics of solid state imaging elements can be reduced, thus making it possible to obtain an accurate white balance.

It is to be noted that the preferred memory device in this embodiment is a ROM table.

Furthermore, a gate circuit is used as the signal selection means in this embodiment, but the same effect can be obtained by using a clipping circuit that clips off signals exceeding a predetermined level. In addition, a video signal is used as the input signal to the multipliers and memory device in this embodiment, but the same effect can be obtained by dividing one screen into plural blocks and using a representative value of the signals in each block as the video signal.

SIXTH EMBODIMENT

The sixth embodiment of an automatic white balance device according to the present invention is described below with reference to the accompanying figures.

Figure 13:
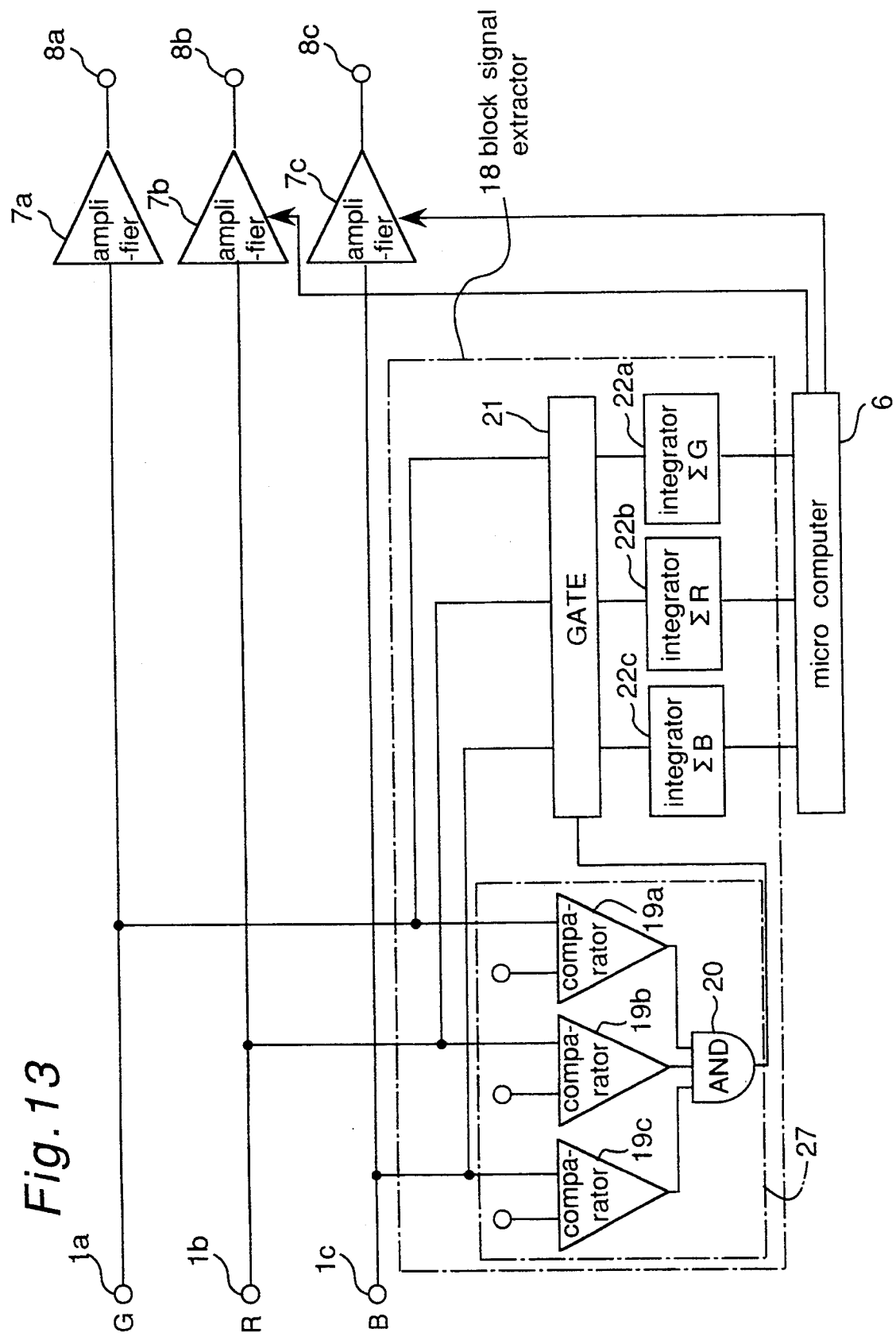
FIG. 13 is a block diagram of an automatic white balance device according to a sixth embodiment of the invention.

Referring to FIG. 13, the chrominance signals input to the G signal input terminal 1a, R signal input terminal 1b, and B signal input terminal 1c are input to a block signal extractor 18 including a comparator 27, which consists of a G signal comparator 19a, a R signal comparator 19b, a B signal comparator 19c and a logical sum circuit 20. In the block signal extractor 18, the G signal is input to the G signal comparator 19a, which compares the input G signal with a signal level that is one-half (½) the dynamic range of the G signal (where the G signal dynamic range is 1). If the G signal is greater than the ½ level, a HIGH signal is output. The R and B signals input to the R and B signal comparators 19b and 19c are similarly compared with a signal level that is one-half (½) the dynamic range of the respective R and B signals (where the dynamic range is 1), and if the R or B signal is greater than the ½ level, a HIGH signal is output by the respective comparator 19b or 19c.

The outputs of the G, R, and B signal comparators 19a, 19b, and 19c are input to the logical sum circuit 20, which outputs a HIGH control signal to the gate circuit 21 when the output signal from each of the G, R, and B signal comparators 19a, 19b, and 19c is HIGH. When the control signal output from the logical sum circuit 20 is HIGH, the gate circuit 21 inputs the input G, R, and B signals to the respective G, R, and B signal block integration circuits 22a, 22b, and 22c, respectively. When the control signal output from the logical sum circuit 20 is LOW, the gate circuit 21 does not input the input G, R, and B signals to the G, R, and B signal block integration circuits 22a, 22b, and 22c.

Figure 14:
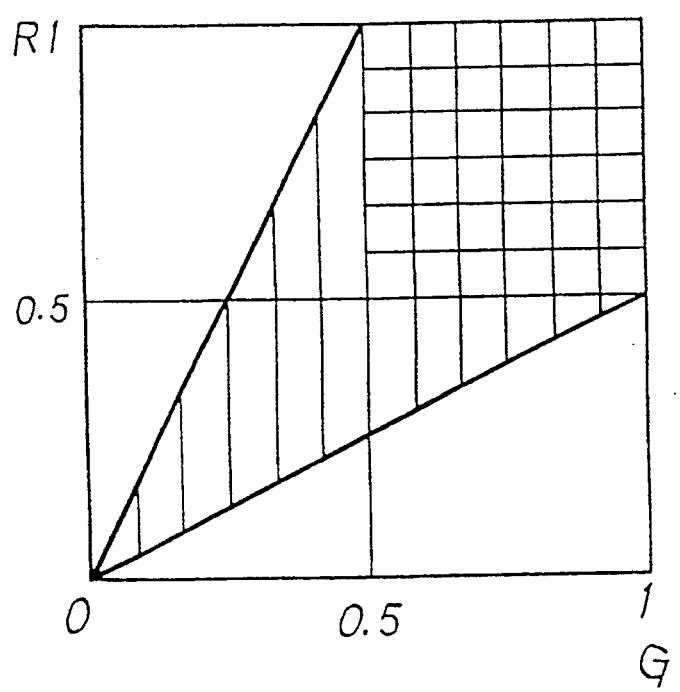
FIG. 14 is a color distribution graph used to describe the operation of an automatic white balance device according to the sixth embodiment of the invention.

The RGB signals throughput by the gate circuit 21 are thus represented by the crosshatched area of the coordinate system shown in FIG. 14. It is to be noted that the FIG. 14 graph has G signal abscissas and R signal ordinates, but the relationship between the G and B signals is expressed in the same area.

Each of the G, R, and B signal block integration circuits 22a, 22b, and 22c divides the video signal for one field into a 48 block matrix of 8 horizontal and 6 vertical blocks as shown in FIG. 4, and each integration circuit outputs the integrated value of the corresponding R, G, or B signal in each block. The operation of the signal block integration circuits 22 conforms to the operation of the block integration circuits 9 described with respect to the first embodiment above.

The 48 sets of G, R, and B signals output from the block signal extractor 18 are input to the microcomputer 6. The microcomputer 6 stores these 48 sets of G, R, and B signals in memory, and divides the R signal level in the first block by the G signal level in the same block to obtain the (R/G) signal, and divides the B signal level in the first block by the G signal level in the same block to obtain the (B/G) signal. The microcomputer 6 then obtains the absolute value of the difference of the (R/G) signal minus the (B/G) signal. If the absolute value is less than or equal to ¾, the microcomputer 6 then determines whether the sum of the two signals ((R/G)+(B/G)) is greater than or equal to 7/4 and less than or equal to 9/4.

Figure 15:
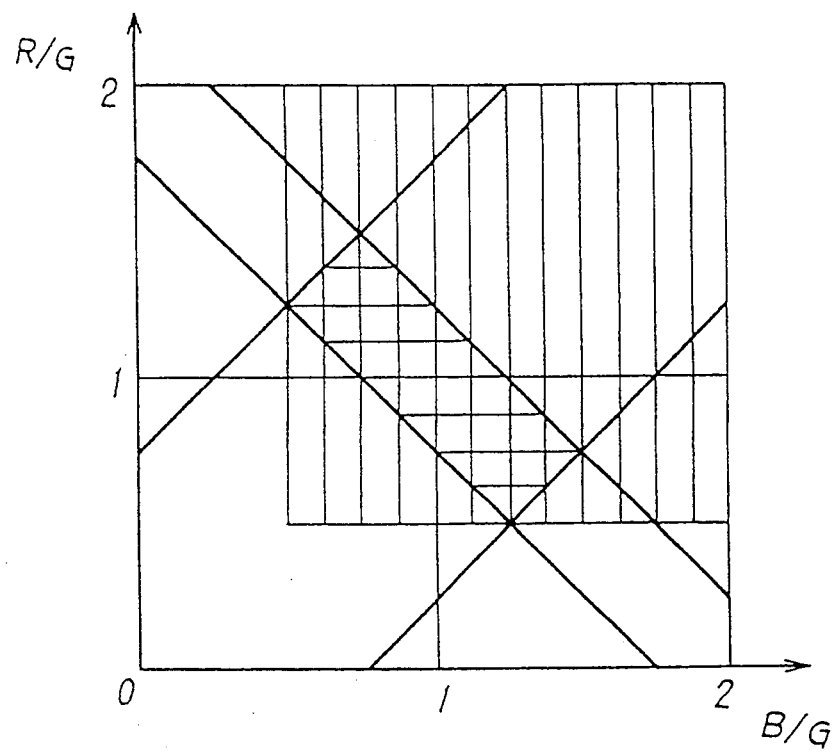
FIG. 15 is a color distribution graph used to describe the operation of an automatic white balance device according to the sixth embodiment of the invention.

The values satisfying this condition will fall within the crosshatched area of the graph in FIG. 15. The signals passed through the gate circuit 21 correspond to the crosshatched area in FIG. 14, but are also included in the area shaded by vertical lines in FIG. 14. The area shaded by vertical lines in FIG. 14 is also the area shaded by vertical lines in FIG. 15. As a result, the R, G, and B signal sets for each block obtained by integrating the signals passed by the gate circuit 21 are distributed in the area shaded by vertical lines in FIG. 15, and there is a high probability that they are also within the crosshatched area of FIG. 15.

The R, G, and B signals are integrated by the microcomputer 6 when the (R/G) and (B/G) signals are in the crosshatched area of FIG. 15. The microcomputer 6 then performs the same operation on the next block, and repeats this operation until all 48 blocks are processed and the integrals are obtained for the R, G, and B signals for which the (R/G) and (B/G) signals are in the crosshatched area of FIG. 15.

The microcomputer 6 then calculates from the R, G, and B signal integrals the amplification rate needed to adjust the white balance. The R signal amplification rate required for white balance adjustment is obtained by dividing the G signal integral by the R signal integral, and the B signal amplification rate required for white balance adjustment is obtained by dividing the G signal integral by the B signal integral. The gain of the R signal amplifier 7b and the B signal amplifier 7c is each adjusted by the amplification rates thus computed, and the white balanced signals are output to the G signal output terminal 8a, R signal output terminal 8b, and B signal output terminal 8c.

The spectral characteristics of a light source are generally expressed by color temperature, but when an achromatic subject is imaged with a high color temperature light source, the B signal level is high and the R signal level is low relative to the G signal level. Conversely, when an achromatic subject is imaged with a low color temperature light source, the R signal level is high and the B signal level is low relative to the G signal level. If the G signal-normalized B signal is expressed as X, the G signal-normalized R signal is Y, and an achromatic subject is imaged under a variety of different color temperature light sources, the values of X and Y will be distributed along the curve ($X \times Y = 1$) in the coordinates of FIG. 15. If the color temperature of the light source is within the range 3000 K. to 8000 K., both X and Y will be within the range 0.5–1.5. Using only those signals that fall within the crosshatched area of FIG. 15 by satisfying these conditions is thus equivalent to calculating the white balance amplification rates using only those signals that have a high probability of being achromatic. In addition, low luminance, chromatic signals can be separated and the amplification rates yielding a more accurate white balance adjustment can be calculated because signals of the same color are distributed along the same coordinates regardless of the luminance level because the X-axis in FIG. 15 represents the B signals normalized by the G signal, and the Y axis represents the R signals normalized by the G signal. Also, it is noted that the present invention can be realized not only by an analog circuit, but also by a digital circuit.

Furthermore, the comparators in this embodiment can be achieved in a digital embodiment by, for example, determining whether a specific bit, e.g., the highest bit in an 8-bit digital signal, is HIGH or LOW to determine whether the signal is greater or less than ½ the dynamic range.

SEVENTH EMBODIMENT

The seventh embodiment of an automatic white balance device according to the present invention is described below with reference to the accompanying figures.

Figure 16:
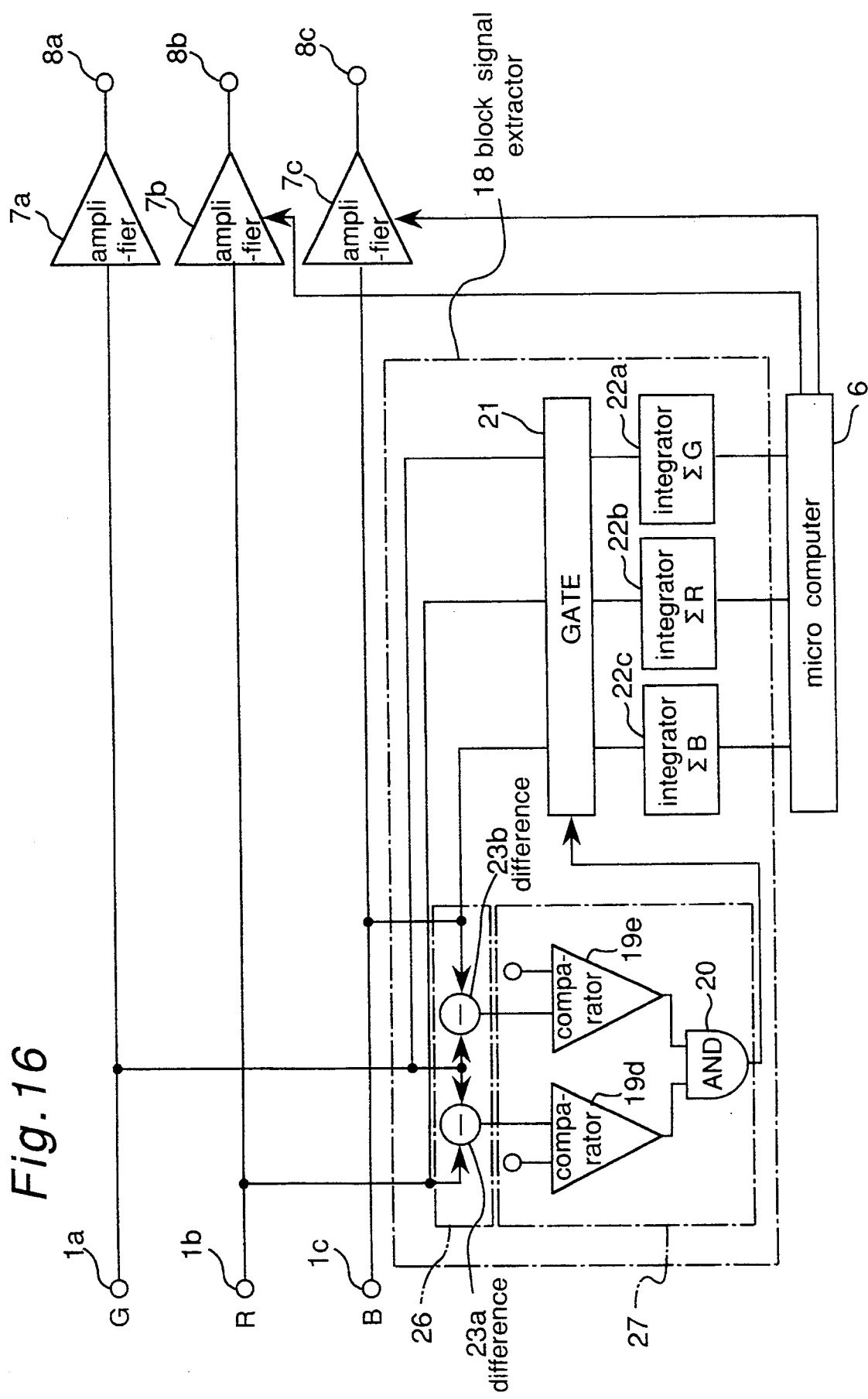
FIG. 16 is a block diagram of an automatic white balance device according to an seventh embodiment of the invention.

Referring to FIG. 16, the chrominance signals input to the G signal input terminal 1a, R signal input terminal 1b, and B signal input terminal 1c are input to the block signal extractor 18 including an operator 26, which consists of a pair of difference circuits 23a, 23b. In the block signal extractor 18, the G and R signals are input to the first difference circuit 23a, which outputs the (R−G) difference signal to the first comparator 19d. The G and B signals are input to the second difference circuit 23b, which outputs the (B−G) difference signal to the second comparator 19e.

The first comparator 19d determines whether the absolute value of the (R−G) difference signal input is less than or equal to one-half (½) the dynamic range of the G signal (where the G signal dynamic range is 1), and outputs a HIGH signal if it is. The second comparator 19e determines whether the absolute value of the (B−G) difference signal input is less than or equal to one-half (½) the dynamic range of the G signal (where the G signal dynamic range is 1), and outputs a HIGH signal if it is.

The outputs of the comparators 19d and 19e are input to the logical sum circuit 20, which outputs a HIGH control signal to the gate circuit 21 when the output signal from each of the signal comparators 19d and 19e is HIGH. When the control signal output from the logical sum circuit 20 is HIGH, the gate circuit 21 inputs the input G, R, and B signals to the respective G, R, and B signal block integration circuits 22a, 22b, and 22c, respectively. When the control signal output from the logical sum circuit 20 is LOW, the gate circuit 21 does not input the input G, R, and B signals to the G, R, and B signal block integration circuits 22a, 22b, and 22c.

Figure 17:
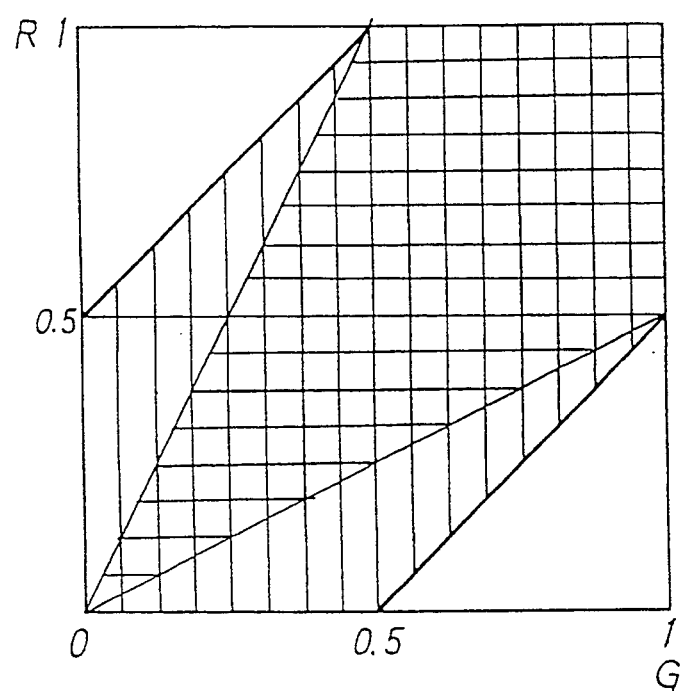
FIG. 17 is a color distribution graph used to describe the operation of an automatic white balance device according to an seventh embodiment of the invention.

The RGB signals throughput by the gate circuit 21 are thus represented by the shaped by vertical lines area of the coordinate system shown in FIG. 17. It is to be noted that the FIG. 17 graph has G signal abscissas and R signal ordinates, but the relationship between the G and B signals is expressed in the same area.

Each of the G, R, and B signal block integration circuits 22a, 22b, and 22c divides the video signal for one field into a 48 block matrix of 8 horizontal and 6 vertical blocks as shown in FIG. 4, and each integration circuit outputs the integrated value of the corresponding R, G, or B signal in each block. The operation of the signal block integration circuits 22 conforms to the operation of the block integration circuits 9 described with respect to the first embodiment above.

The 48 sets of G, R, and B signals output from the block signal extractor 18 are input to the microcomputer 6, which operates as described in the sixth embodiment of the invention above.

The gain of the R signal amplifier 7b and the B signal amplifier 7c is each adjusted by the amplification rates thus computed by the microcomputer 6, and the white balanced signals are output to the G signal output terminal 8a, R signal output terminal 8b, and B signal output terminal 8c.

The values used by the microcomputer 6 to calculate the amplification rates are within the range shown by the crosshatched area of the graph in FIG. 15. The signals passed through the gate circuit 21 correspond to the area shaded by vertical lines in FIG. 17, but also include the crosshatched area in FIG. 17. This crosshatched area is also the area shaded by vertical lines in FIG. 15. As a result, the R, G, and B signal sets for each block obtained by integrating the signals passed by the gate circuit 21 are distributed in and around the area shaded by vertical lines in FIG. 15, and there is a high probability that they are also within the cross-hatched area of FIG. 15, making it possible to obtain an accurate white balance. Also, it is noted that the present invention can be realized not only by an analog circuit, but also by a digital circuit.

EIGHTH EMBODIMENT

The eighth embodiment of an automatic white balance device according to the present invention is described below with reference to the accompanying figures.

Figure 19:
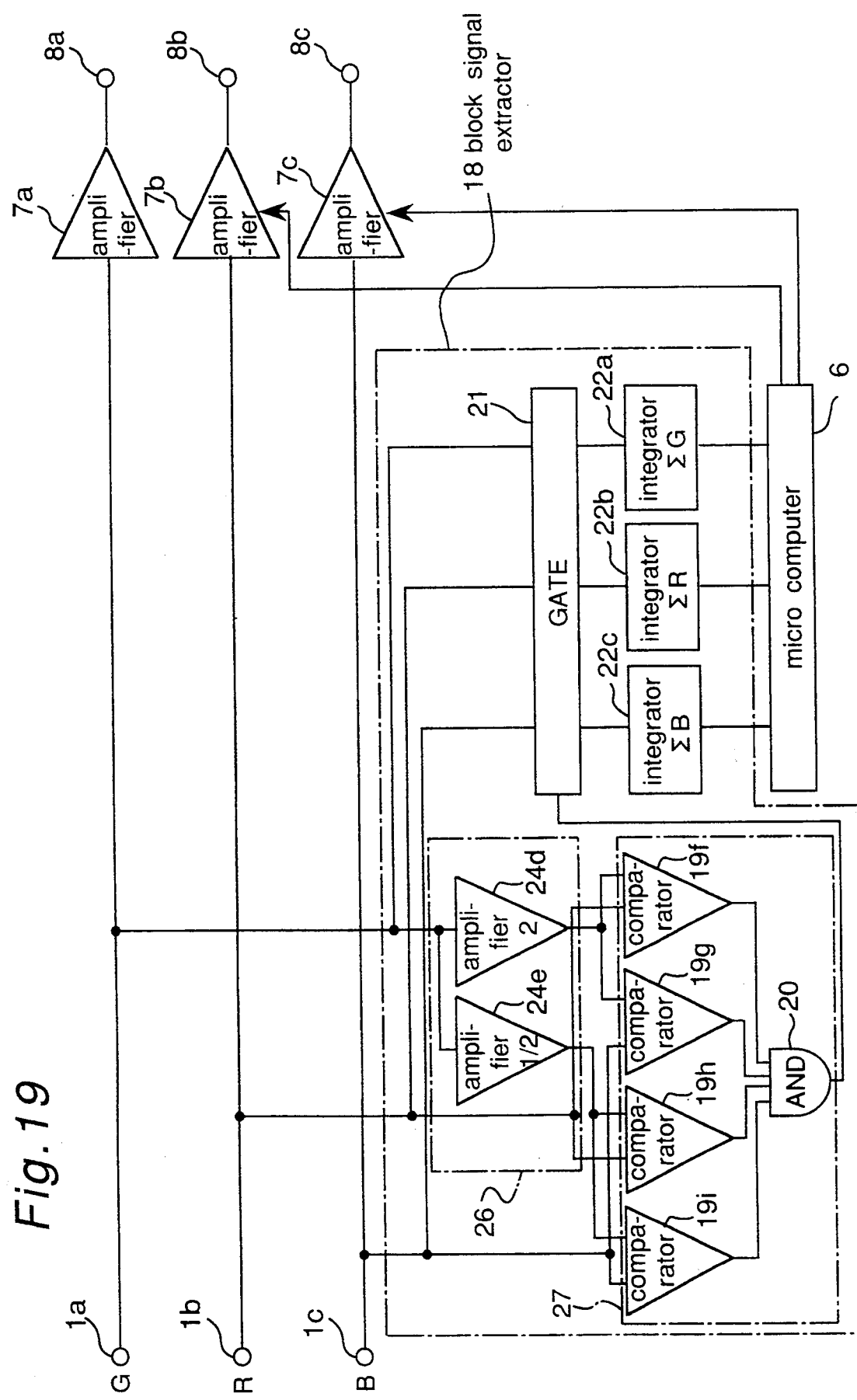
FIG. 19 is a block diagram of an automatic white balance device according to the eighth embodiment of the invention.

Referring to FIG. 19, the chrominance signals input to the G signal input terminal 1a, R signal input terminal 1b, and B signal input terminal 1c are input to the block signal extractor 18 including an operator 26, which consists of a pair of amplifiers 24e and 24d. In the block signal extractor 18, the G signal is input to the first amplifier 24d and thereby multiplied by 2, and is input to the second amplifier 24e and there by multiplied by ½.

The 2G signal output from the first amplifier 24d and the R signal are input to the first comparator 19f, which outputs a HIGH signal if the 2G signal is greater than the R signal. The 2G signal output from the first amplifier 24d and the B signal are input to the second comparator 19g, which outputs a HIGH signal if the 2G signal is greater than the B signal. The ½ G signal output from the second amplifier 24e and the R signal are input to the third comparator 19h, which outputs a HIGH signal if the R signal is greater than the ½ G signal. The ½ G signal output from the second amplifier 24e and the B signal are input to the fourth comparator 19i, which outputs a HIGH signal if the B signal is greater than the ½ G signal.

The outputs of the comparators 19f, 19g, 19h, and 19i are input to the logical sum circuit 20, which outputs a HIGH control signal to the gate circuit 21 when the output signal from each of the signal comparators 19f, 19g, 19h, and 19i is HIGH, and otherwise outputs a LOW control signal. When the control signal output from the logical sum circuit 20 is HIGH, the gate circuit 21 inputs the input G, R, and B signals to the respective G, R, and B signal block integration circuits 22a, 22b, and 22c, respectively. When the control signal output from the logical sum circuit 20 is LOW, the gate circuit 21 does not input the input G, R, and B signals to the G, R, and B signal block integration circuits 22a, 22b, and 22c.

Figure 18:
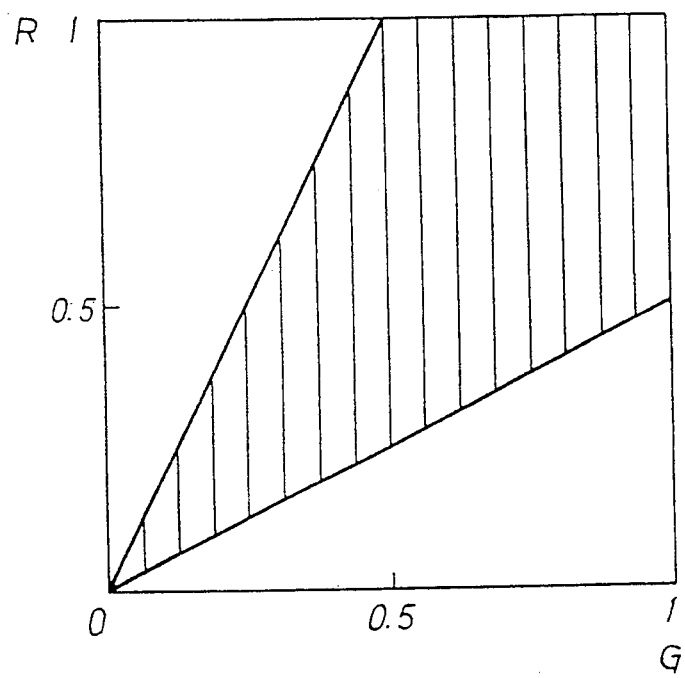
FIG. 18 is a color distribution graph used to describe the operation of an automatic white balance device according to a eighth embodiment of the invention.

The relationship between the RGB signals throughput by the gate circuit 18 is thus (G/2<R<2G) and (G/2<B<2G), and is represented by the shaded area in FIG. 18. It is to be noted that the FIG. 18 graph has G signal abscissas and R signal ordinates, but the relationship between the G and B signals is expressed in the same area. Each of the G, R, and B signal block integration circuits 22a, 22b, and 22c divides the video signal for one field into a 48 block matrix of 8 horizontal and 6 vertical blocks as shown in FIG. 4, and each integration circuit outputs the integrated value of the corresponding R, G, or B signal in each block. The operation of the signal block integration circuits 22 conforms to the operation of the block integration circuits 9 described with respect to the first embodiment above.

The 48 sets of G, R, and B signals output from the block signal extractor 18 are input to the microcomputer 6, which operates as described in the sixth embodiment of the invention above.

The gain of the R signal amplifier 7b and the B signal amplifier 7c is each adjusted by the amplification rates thus computed by the microcomputer 6, and the white balanced signals are output to the G signal output terminal 8a, R signal output terminal 8b, and B signal output terminal 8c.

The values used by the microcomputer 6 to calculate the amplification rates are within the range shown by the crosshatched area of the graph in FIG. 15. The signals passed through the gate circuit 21 correspond to the area shaded by vertical lines in FIG. 18, which is also the area shaded by vertical lines in FIG. 15. As a result, the R, G, and B signal sets for each block obtained by integrating the signals passed by the gate circuit 21 are distributed in the area shaded by vertical lines in FIG. 15, and there is a high probability that they are also within the crosshatched area of FIG. 15, making it possible to obtain an accurate white balance. Also, it is noted that the present invention can be realized not only by an analog circuit, but also by a digital circuit.

NINTH EMBODIMENT

The ninth embodiment of an automatic white balance device according to the present invention is described below with reference to the accompanying figures.

Figure 20:
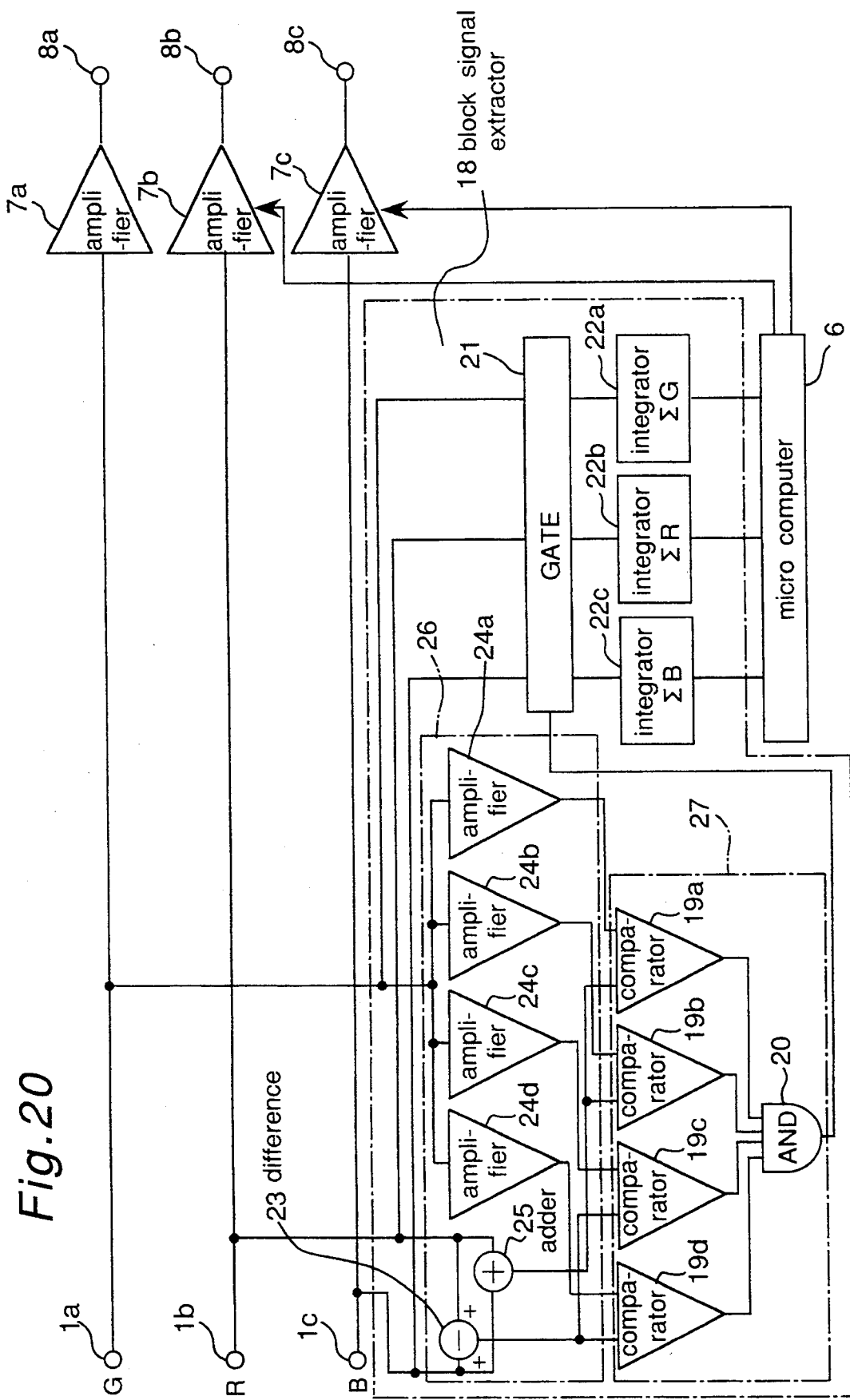
FIG. 20 is a block diagram of an automatic white balance device according to a ninth embodiment of the invention.

Referring to FIG. 20, the chrominance signals input to the G signal input terminal 1a, R signal input terminal 1b, and B signal input terminal 1c are input to the block signal extractor 18. Including an operator 26, which consists of an adding circuit 25, a difference circuit 23, a set of four amplifiers 24a to 24d. In the block signal extractor 18, the R and B signals are input to the adding circuit 25 and the difference circuit 23, which respectively output the sum signal (R+B) and the difference signal (R−B).

The G signal is input to the first, second, third, and fourth amplifiers 24a, 24b, 24c, and 24d, which output the 5/2 amplified G signal, 3/2 amplified G signal, an unamplified (1X) G signal and inverted (−1X amplified) G signal, respectively.

The sum signal (R+B) and the 5/2 amplified G signal output from the first amplifier 24a are input to the first comparator 19a, which outputs a HIGH signal if the (R+B) sum signal is less than the 5/2 G signal. The 3/2 G signal output from the second amplifier 24b and the (R+B) sum signal are input to the second comparator 19b, which outputs a HIGH signal if the (R+B) sum signal is greater than the 3/2 G signal. The 1X G signal output from the third amplifier 24c and the (R−B) difference signal are input to the third comparator 19c, which outputs a HIGH signal if the (R−B) difference signal is less than the 1X G signal. The −1X G signal output from the fourth amplifier 24d and the (R−B) difference signal are input to the fourth comparator 19d, which outputs a HIGH signal if the (R−B) difference signal is greater than the −1X G signal.

The outputs of the comparators 19a, 19b, 19c, and 19d are input to the logical sum circuit 20, which outputs a HIGH control signal to the gate circuit 21 when the output signal from each of the signal comparators is HIGH, and otherwise outputs a LOW control signal. When the control signal output from the logical sum circuit 20 is HIGH, the gate circuit 21 inputs the input G, R, and B signals to the respective G, R, and B signal block integration circuits 22a, 22b, and 22c, respectively. When the control signal output from the logical sum circuit 20 is LOW, the gate circuit 21 does not input the input G, R, and B signals to the G, R, and B signal block integration circuits 22a, 22b, and 22c.

Figure 21:
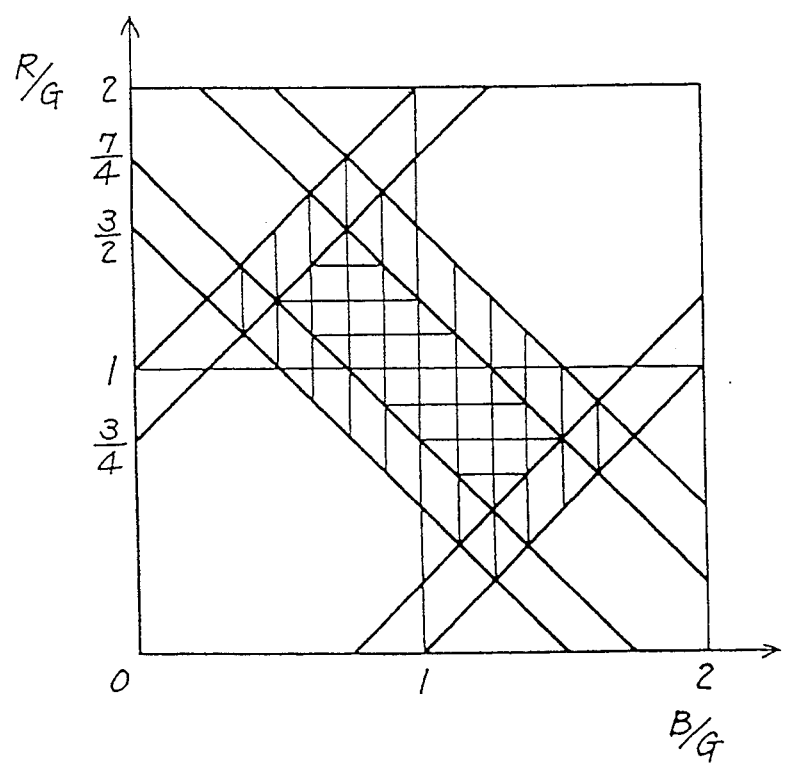
FIG. 21 is a color distribution graph used to describe the operation of an automatic white balance device according to the ninth embodiment of the invention.

The relationship between the RGB signals throughput by the gate circuit 21 is thus (3G/2<R+B<5G/2) and (−G<R−B<G), and is represented by the area shaded by vertical lines in FIG. 21.

Each of the G, R, and B signal block integration circuits 22a, 22b, and 22c divides the video signal for one field into a 48 block matrix of 8 horizontal and 6 vertical blocks as shown in FIG. 4, and each integration circuit outputs the integrated value of the corresponding R, G, or B signal in each block. The operation of the signal block integration circuits 22 conforms to the operation of the block integration circuits 9 described with respect to the first embodiment above.

The 48 sets of G, R, and B signals output from the block signal extractor 18 are input to the microcomputer 6, which operates as described in the sixth embodiment of the invention above.

The gain of the R signal amplifier 7b and the B signal amplifier 7c is each adjusted by the amplification rates thus computed by the microcomputer 6, and the white balanced signals are output to the G signal output terminal 8a, R signal output terminal 8b, and B signal output terminal 8c.

The values used by the microcomputer 6 to calculate the amplification rates are within the range shown by the crosshatched area of the graph in FIG. 21. The signals passed through the gate circuit 21 correspond to the area shaded by vertical lines in FIG. 21. As a result, the R, G, and B signal sets for each block obtained by integrating the signals passed by the gate circuit 21 are distributed in the area shaded by vertical lines in FIG. 21, and there is a high probability that they are also within the crosshatched area of FIG. 21, making it possible to obtain an accurate white balance.

In addition, the size of the area indicated by vertical line shading in FIG. 21 can be increased by changing the amplification rate of the amplifiers 24, making it possible to increase the range when there are few achromatic areas in the image, narrow the range when there are many achromatic areas in the image, and thus obtain an even more accurate white balance. Also, it is noted that the present invention can be realized not only by an analog circuit, but also by a digital circuit.

Furthermore, the amplifiers in this embodiment can be achieved with digital signal processing by bit shifting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

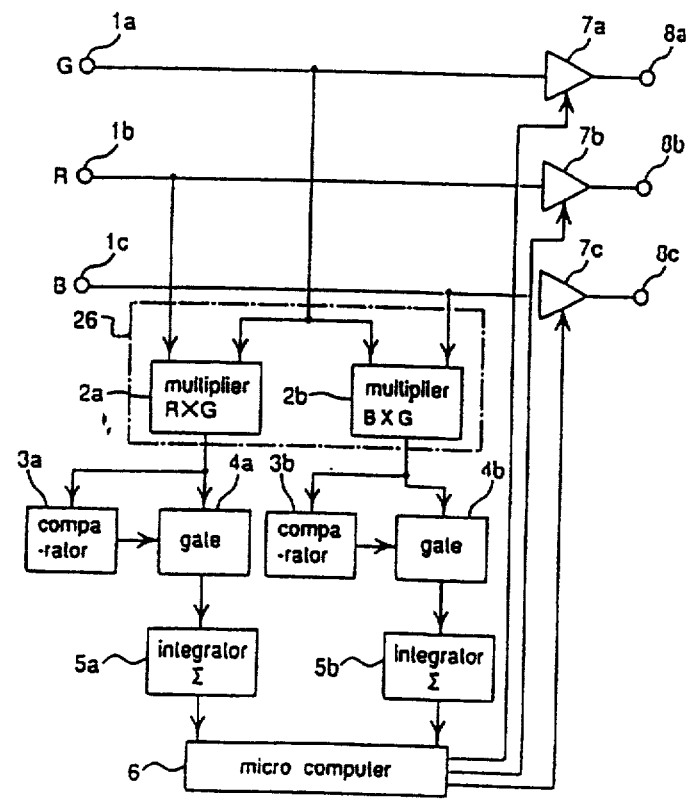

What is claimed is:

1. An automatic white balance device of a video camera comprising:
    comparison circuit means for comparing an R signal, a G signal and a B signal expressing a color signal with respective predetermined levels and for outputting a control signal, when each of the R signal, G signal and B signal is larger than one-half a dynamic range of each signal,
    selection means for selecting the R signal, G signal and B signal in response to the control signal and for producing an output,
    integrator means for integrating the selection means output and for producing an output,
    micro-computer means for calculating an amplification rate of the white balance from the integrator means output and for producing an output, and amplifier means for amplifying the R, G and B signals to produce video output signals in response to the output of micro-computer means, whereby the amplification rate of the amplifier means is adjusted to obtain the white balance.

2. An automatic white balance device of a video camera comprising:

operator means for amplifying and attenuating a G signal to define a range, comparison circuit means for outputting a control signal when an R signal is within the range and when a B signal is within the range, selection means for selecting the R signal, the G signal and the B signal in response to the control signal and for producing an output signal, integrator means for integrating the selection means output signal and for producing an output, micro-computer means for calculating an amplification rate of the white balance from the integrator means output and for producing an output, and amplifier means for amplifying the R, G and B signals in response to the micro-computer means output, whereby the amplification rate of the amplifier means is adjusted to obtain the white balance.

3. An automatic white balance device of a video camera as defined in claim 2, wherein the operator means includes a first amplifier and a second amplifier each producing an output, the comparison circuit includes a first comparator, a second comparator, a third comparator, a fourth comparator each for producing an output and a logical operation circuit for producing a control signal, the G signal is amplified by the first amplifier and attenuated by the second amplifier to define a range, the output signal of first amplifier and the R signal are input to the first comparator, the output of first amplifier and the B signal are input to the second comparator, the output of second amplifier and the R signal are input to the third comparator, the output of second amplifier and the B signal are input to the fourth comparator, the outputs of first, second, third and fourth comparators are input to the logical operation circuit, the control signal is output when the R signal and B signal are within the range, the selection means selects the R signal, G signal and B signal in response to the control signal, the output from the selection means is integrated in the integrator means, and the output of integrator means is used to calculate the amplification rate of the white balance, and the amplification rate of amplifier is adjusted to obtain the white balance.

4. An automatic white balance device of a video camera comprising:

operator means for adding and subtracting an R signal and a B signal, and amplify and attenuate a G signal to define a range, which the sum and difference between the R signal and the B signal of a chromatic signal are distributed, comparison circuit means for outputting a control signal when the sum and difference between the R signal and the B signal are within the range, selection means for selecting and outputting the R signal, G signal and B signal in response to the control signal from the comparison circuit means, integrator means for integrating the selection means output, micro-computer means for receiving the integrator means output and calculating an amplification rate of the white balance and for producing an output, and amplifier means for amplifying the R, G, and B signals in response to the micro-computer means output, whereby the amplification rate of amplifier is adjusted to obtain the white balance.

5. An automatic white balance device comprising:

operator means comprising an addition circuit, a difference circuit, a first amplifier, a second amplifier, a third amplifier and a fourth amplifier, comparison circuit means comprising a first comparator, a second comparator, a third comparator, a fourth comparator and a logical operation circuit, a G signal is amplified by the first, second, third and fourth amplifiers, the addition circuit obtains the sum of a R signal and a B signal, the difference circuit obtains the difference of the R signal and the B signal, the output signal from the first amplifier and the output signal from the addition circuit are input to the first comparator, the output signal from the second amplifier and the output from the addition circuit are input to the second comparator, the output signal from the third amplifier and the output signal from the difference circuit are input to the third comparator, the output signal from the fourth amplifier and the output from the difference circuit are input to the fourth comparator, the output signals from the first, second, third and fourth comparators are input to the logical operation circuit, the control signal from the comparison circuit means is output when the sum and difference between the R signal and the B signal are within the range defined by the G signal, selection means for selecting and outputting the R signal, G signal, B signal in response to the control signal from the comparison circuit means, integrator means for integrating the selection means output, micro-computer means for receiving the integrator means output and calculating an amplification rate of a white balance and for producing an output, and amplifier means for amplifying the R, G and B signals in response to the micro-computer means output, whereby the amplification rate of the amplifier means is adjusted to obtain the white balance.

* * * * *

UNITED STATES PATENT AND TRADEMARK OFFICE
CERTIFICATE OF CORRECTION

PATENT NO.   : 5,361,093
DATED        : November 1, 1994
INVENTOR(S)  : Yamamoto et al.

It is certified that error appears in the above-identified patent and that said Letters Patent is hereby corrected as shown below:

```
On the cover page, item [75] Inventors, the second
inventor's name should be --Masayuki Yoneyama--
```

Signed and Sealed this

Twelfth Day of December, 1995

Attest:

BRUCE LEHMAN

*Attesting Officer*       *Commissioner of Patents and Trademarks*

UNITED STATES PATENT AND TRADEMARK OFFICE
CERTIFICATE OF CORRECTION

PATENT NO.    : 5,361,093                                    Page 1 of 3
DATED         : November 1, 1994
INVENTOR(S)   : Yamamoto et al.

It is certified that error appears in the above-indentified patent and that said Letters Patent is hereby corrected as shown below:

The title page, showing an illustrative figure, should be deleted and substitute therefor the attached title page.

Delete Drawing Sheet 1 and substitute therefor the Drawing sheet consisting of Fig. 1, as shown on the attached page.

Signed and Sealed this

Eleventh Day of March, 1997

*Attest:*

BRUCE LEHMAN

*Attesting Officer*          Commissioner of Patents and Trademarks

UNITED STATES PATENT AND TRADEMARK OFFICE
CERTIFICATE OF CORRECTION

PATENT NO. : 5,361,093
DATED : November 1, 1994
INVENTOR(S) : Yamamoto et al.

It is certified that error appears in the above-identified patent and that said Letters Patent is hereby corrected as shown below:

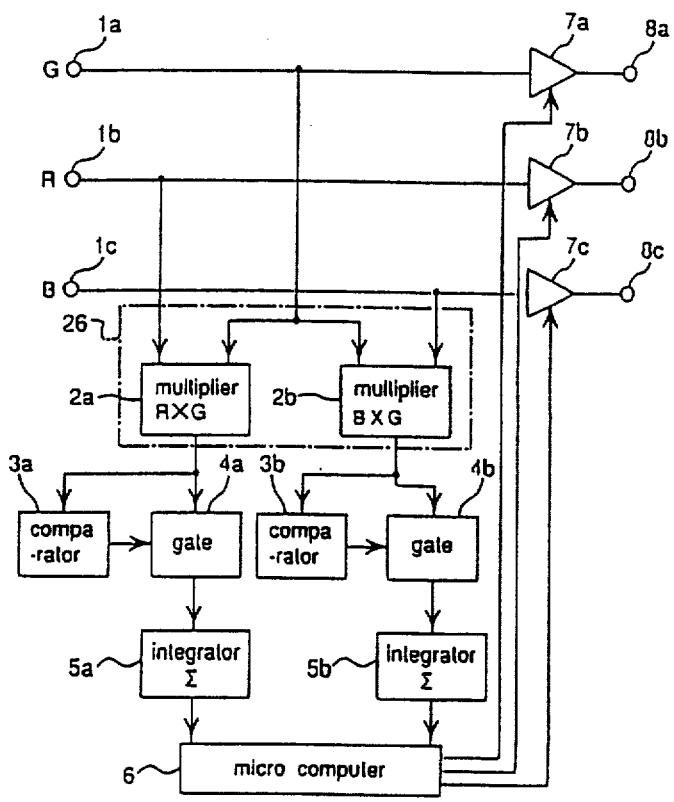

United States Patent [19]

Yamamoto et al.

[11] Patent Number: 5,361,093
[45] Date of Patent: Nov. 1, 1994

[54] AUTOMATIC WHITE BALANCE SETTING DEVICE

[75] Inventors: Yasutoshi Yamamoto, Katano; Masayuki Noneyama, Takatsuki; Norio Suzuki, Neyagawa, all of Japan

[73] Assignee: Matsushita Electric Industrial Co., Ltd., Osaka, Japan

[21] Appl. No.: 938,953

[22] Filed: Sep. 1, 1992

[30] Foreign Application Priority Data

| Sep. 2, 1991 | [JP] | Japan | 3-221501 |
| Sep. 2, 1991 | [JP] | Japan | 3-221502 |
| Sep. 2, 1991 | [JP] | Japan | 3-221503 |
| Apr. 10, 1992 | [JP] | Japan | 4-090503 |
| Apr. 10, 1992 | [JP] | Japan | 4-090504 |

[51] Int. Cl.$^5$ .................. H04N 9/73; H04N 9/04
[52] U.S. Cl. ........................ 348/223; 348/656
[58] Field of Search ............. 358/29 C, 29, 41, 22; 348/656, 223; H04N 9/73, 9/04

[56] References Cited

U.S. PATENT DOCUMENTS

| 3,877,068 | 4/1975 | Kosaka et al. | 358/29 |
| 4,219,841 | 8/1980 | Nishimura et al. | 358/29 C |
| 4,797,733 | 1/1989 | Takagi et al. | 358/29 C |
| 5,177,599 | 1/1993 | Takagi et al. | 358/29 C |

FOREIGN PATENT DOCUMENTS

| 0335623 | 10/1989 | European Pat. Off. | H04N 9/73 |
| 0400606 | 12/1990 | European Pat. Off. | H04N 9/73 |
| 0429992 | 6/1991 | European Pat. Off. | H04N 9/73 |
| 2287819 | 5/1976 | France | H04N 9/73 |
| 2650143 | 1/1991 | France | H04N 9/73 |
| 62-029296 | 2/1987 | Japan | H04N 9/73 |
| 62-107591 | 5/1987 | Japan | H04N 9/73 |
| 29296 | 7/1987 | Japan | H04N 9/73 |
| 63-219291 | 9/1988 | Japan | H04N 9/73 |
| 257786 | 8/1990 | Japan | H04N 9/73 |

*Primary Examiner*—James J. Groody
*Assistant Examiner*—Glenton B. Burgess
*Attorney, Agent, or Firm*—Ratner & Prestia

[57] ABSTRACT

An automatic white balance device that uses a video signal to obtain the white balance data, and is characterized by using a third video signal, selectively obtained using a first video signal expressing the color signals and a second video signal expressing the luminance, to obtain the white balance.

5 Claims, 17 Drawing Sheets